(12) United States Patent
Cross et al.

(10) Patent No.: US 10,986,894 B2
(45) Date of Patent: *Apr. 27, 2021

(54) AUXETIC STRUCTURES AND FOOTWEAR WITH SOLES HAVING AUXETIC STRUCTURES

(71) Applicant: NIKE, Inc., Beaverton, OR (US)

(72) Inventors: Tory M. Cross, Portland, OR (US); Kevin W. Hoffer, Portland, OR (US); David P. Jones, Beaverton, OR (US); Patrick B. Kirschner, Beaverton, OR (US); Elizabeth Langvin, Sherwood, OR (US); James C. Meschter, Portland, OR (US)

(73) Assignee: NIKE, Inc., Beaverton, OR (US)

( * ) Notice: Subject to any disclaimer, the term of this patent is extended or adjusted under 35 U.S.C. 154(b) by 152 days.

This patent is subject to a terminal disclaimer.

(21) Appl. No.: 16/052,986

(22) Filed: Aug. 2, 2018

(65) Prior Publication Data

US 2018/0338569 A1 Nov. 29, 2018

Related U.S. Application Data

(62) Division of application No. 15/193,319, filed on Jun. 27, 2016, now Pat. No. 10,051,914, which is a (Continued)

(51) Int. Cl.
*A43B 13/18* (2006.01)
*A43B 13/22* (2006.01)
(Continued)

(52) U.S. Cl.
CPC .......... *A43B 13/181* (2013.01); *A43B 1/0009* (2013.01); *A43B 3/0073* (2013.01);
(Continued)

(58) Field of Classification Search
CPC ..... A43B 13/181; A43B 13/04; A43B 13/141; A43B 13/14; A43B 13/122; A43B 13/187;
(Continued)

(56) References Cited

U.S. PATENT DOCUMENTS 2,800,423 A * 7/1957 De Swart ................ B29B 15/08
428/136
4,272,850 A 6/1981 Rule
(Continued)

FOREIGN PATENT DOCUMENTS

JP H06269303 A 9/1994
JP H07213304 A 8/1995
(Continued)

OTHER PUBLICATIONS

Joseph N. Grima and Kenneth E. Evans, Auxetic behavior from rotating triangles, Journal of Materials Science, May 2006, vol. 41, Issue 10, pp. 3193-3196, https://doi.org/10.1007/s10853-006-6339-8.

Primary Examiner — Shaun R Hurley
Assistant Examiner — Bao-Thieu L Nguyen
(74) Attorney, Agent, or Firm — Quinn IP Law

(57) ABSTRACT

A material that includes at least one layer made of an auxetic structure and articles of footwear having soles comprising the materials. When the material is under tension, it expands in both the direction under tension and in the direction orthogonal to the direction under tension. The articles of footwear have soles that have at least one layer made of a material that has a pattern of apertures to provide the auxetic structure. The apertures are surrounded by sole portions that can rotate or pivot to change the size of the apertures. An outer covering can be mated with an outsole structure formed by the auxetic structure. The outer covering includes features that mate with the apertures in the outsole structure.

(Continued)

The outer covering is elastic and can stretch to accommodate expansion of the auxetic structure.

8 Claims, 43 Drawing Sheets

Related U.S. Application Data division of application No. 14/030,002, filed on Sep. 18, 2013, now Pat. No. 9,402,439.

(51) Int. Cl.

| | |
|---|---|
| A43B 5/00 | (2006.01) |
| A43B 13/02 | (2006.01) |
| A43B 1/00 | (2006.01) |
| A43B 3/00 | (2006.01) |
| A43B 13/12 | (2006.01) |
| B29C 44/34 | (2006.01) |
| A43B 13/14 | (2006.01) |
| A43C 11/00 | (2006.01) |
| A43B 13/04 | (2006.01) |
| A43C 15/16 | (2006.01) |

(52) U.S. Cl.
CPC ............... *A43B 5/00* (2013.01); *A43B 13/02* (2013.01); *A43B 13/04* (2013.01); *A43B 13/122* (2013.01); *A43B 13/14* (2013.01); *A43B 13/141* (2013.01); *A43B 13/187* (2013.01); *A43B 13/188* (2013.01); *A43B 13/22* (2013.01); *A43B 13/223* (2013.01); *A43B 13/226* (2013.01); *A43C 11/002* (2013.01); *A43C 15/16* (2013.01); *B29C 44/357* (2013.01); *Y10T 428/24298* (2015.01)

(58) Field of Classification Search
CPC ..... A43B 13/188; A43B 13/22; A43B 13/223; A43B 13/226; A43B 13/02; A43B 3/16; B29C 44/357; A43C 15/061; A43C 15/06; A43C 15/09; A43C 15/063; A43C 15/12; A43C 15/00; A43C 15/02; A43C 15/065; A43C 15/068
See application file for complete search history.

(56) References Cited

U.S. PATENT DOCUMENTS

| | | | | |
|---|---|---|---|---|
| 4,668,557 | A * | 5/1987 | Lakes | B29C 44/56 |
| | | | | 428/131 |
| 4,823,799 | A | 4/1989 | Robbins | |
| 5,188,874 | A * | 2/1993 | Kauffman | B29B 15/08 |
| | | | | 156/163 |
| 6,266,896 | B1 | 7/2001 | Liu | |
| 7,434,338 | B2 * | 10/2008 | Pfander | A43B 7/144 |
| | | | | 36/141 |
| 7,608,314 | B2 | 10/2009 | Plant | |
| 7,910,193 | B2 * | 3/2011 | Ma | A47C 23/002 |
| | | | | 428/218 |
| 8,002,879 | B2 | 8/2011 | Hook | |
| 8,084,117 | B2 * | 12/2011 | Lalvani | B32B 3/266 |
| | | | | 428/135 |
| 8,277,719 | B2 | 10/2012 | Alderson et al. | |
| 8,333,024 | B2 | 12/2012 | Fallow et al. | |
| 8,707,582 | B2 * | 4/2014 | Klassen | A43B 13/181 |
| | | | | 36/27 |
| 8,844,170 | B2 * | 9/2014 | Ferrigan | A43B 3/0042 |
| | | | | 36/102 |
| 8,919,016 | B2 | 12/2014 | McDonald et al. | |
| 9,402,439 | B2 * | 8/2016 | Cross | B29C 44/357 |
| 9,456,656 | B2 * | 10/2016 | Cross | A43B 13/181 |
| 9,474,326 | B2 * | 10/2016 | Langvin | A43B 13/181 |
| 9,554,620 | B2 * | 1/2017 | Cross | B32B 27/065 |
| 9,554,624 | B2 * | 1/2017 | Cross | A43B 13/22 |
| 9,681,703 | B2 * | 6/2017 | Cross | A43B 13/187 |
| 9,820,532 | B2 | 11/2017 | Cross et al. | |
| 10,206,454 | B2 * | 2/2019 | Langvin | A43B 13/04 |
| 2005/0268490 | A1 | 12/2005 | Foxen | |
| 2006/0213091 | A1 | 9/2006 | Ometto et al. | |
| 2007/0213838 | A1 * | 9/2007 | Hengelmolen | A61F 2/915 |
| | | | | 623/23.71 |
| 2008/0011021 | A1 | 1/2008 | Starbuck et al. | |
| 2008/0248710 | A1 * | 10/2008 | Wittner | D04H 1/559 |
| | | | | 442/328 |
| 2010/0095551 | A1 * | 4/2010 | Gupta | A43B 7/144 |
| | | | | 36/29 |
| 2011/0059291 | A1 * | 3/2011 | Boyce | C08J 5/18 |
| | | | | 428/136 |
| 2011/0144417 | A1 * | 6/2011 | Jagger | A61F 2/0063 |
| | | | | 600/30 |
| 2011/0168313 | A1 * | 7/2011 | Ma | B60C 7/14 |
| | | | | 152/302 |
| 2011/0282452 | A1 * | 11/2011 | Koerner | A61L 27/50 |
| | | | | 623/16.11 |
| 2012/0021167 | A1 | 1/2012 | Plant | |
| 2013/0074363 | A1 * | 3/2013 | Adams | A43B 3/18 |
| | | | | 36/7.1 R |
| 2014/0053311 | A1 | 2/2014 | Nordstrom et al. | |
| 2014/0059734 | A1 | 3/2014 | Toronjo | |
| 2014/0090271 | A1 | 4/2014 | Hoffer et al. | |
| 2014/0101816 | A1 | 4/2014 | Toronjo | |
| 2014/0205795 | A1 | 7/2014 | Hu | |
| 2014/0260281 | A1 | 9/2014 | Innes | |
| 2014/0325877 | A1 * | 11/2014 | Santos | A43B 3/246 |
| | | | | 36/103 |
| 2014/0373392 | A1 * | 12/2014 | Cullen | A43B 1/00 |
| | | | | 36/103 |
| 2015/0007456 | A1 * | 1/2015 | Klassen | F16F 1/373 |
| | | | | 36/102 |
| 2015/0251493 | A1 * | 9/2015 | Ma | B60B 9/04 |
| | | | | 152/80 |
| 2016/0025343 | A1 | 1/2016 | Bertoldi et al. | |
| 2016/0025344 | A1 | 1/2016 | Bertoldi et al. | |
| 2016/0040962 | A1 | 2/2016 | Rossow et al. | |
| 2016/0095385 | A1 * | 4/2016 | Nordstrom | A43B 13/20 |
| | | | | 36/29 |
| 2019/0150556 | A1 * | 5/2019 | Langvin | A43B 13/14 |

FOREIGN PATENT DOCUMENTS

| | | |
|---|---|---|
| JP | H07227301 A | 8/1995 |
| JP | H08214908 A | 8/1996 |

* cited by examiner

AUXETIC STRUCTURES AND FOOTWEAR WITH SOLES HAVING AUXETIC STRUCTURES

CROSS REFERENCE TO RELATED APPLICATION

This application is a divisional of U.S. patent application Ser. No. 15/193,319, published as US 2016/0302520, which is a divisional of U.S. Pat. No. 9,402,439. Both references are incorporated by reference in their entirety.

BACKGROUND

Articles of footwear typically have at least two major components, an upper that provides the enclosure for receiving the wearer's foot, and a sole secured to the upper that is the primary contact to the ground or playing surface. The footwear may also use some type of fastening system, for example, laces or straps or a combination of both, to secure the footwear around the wearer's foot. The sole may comprise three layers—an inner sole, a midsole and an outer sole. The outer sole is the primary contact to the ground or the playing surface. It generally carries a tread pattern and/or cleats or spikes or other protuberances that provide the wearer of the footwear with improved traction suitable to the particular athletic, work or recreational activity, or to a particular ground surface.

SUMMARY

As used herein, the term "auxetic structure" generally refers to a structure that, when it is placed under tension in a first direction, increases its dimensions in a direction that is orthogonal to the first direction. For example, if the structure can be described as having a length, a width and a thickness, then when the structure is under tension longitudinally, it increases in width. In certain of the embodiments, the auxetic structures are bi-directional such that they increase in length and width when stretched longitudinally and in width and length when stretched laterally, but do not increase in thickness. Such auxetic structures are characterized by having a negative Poisson's ratio. Also, although such structures will generally have at least a monotonic relationship between the applied tension and the increase in the dimension orthogonal to the direction of the tension, that relationship need not be proportional or linear, and in general need only increase in response to increased tension.

The article of footwear includes an upper and a sole. The sole may include an inner sole, a midsole and an outer sole. The sole includes at least one layer made of an auxetic structure. This layer can be referred to as an "auxetic layer." When the person wearing the footwear engages in an activity, such as running, turning, leaping or accelerating, that puts the auxetic layer under increased longitudinal or lateral tension, the auxetic layer increases its length and width and thus provides improved traction, as well as absorbing some of the impact with the playing surface. Although the descriptions below only discuss a limited number of types of footwear, embodiments can be adapted for many sport and recreational activities, including tennis and other racquet sports, walking, jogging, running, hiking, handball, training, running or walking on a treadmill, as well as team sports such as basketball, volleyball, lacrosse, field hockey and soccer.

In one aspect, an article of footwear includes an upper and a sole structure. The sole structure includes an outsole, where the sole structure has a first direction that is tangential to an outer surface of the outsole and the sole structure has a second direction that is orthogonal to the first direction, where the second direction is also tangential to the outer surface of the outsole. The sole structure further includes a plurality of apertures arranged in geometric patterns. Tensioning the sole structure in the first direction causes the outsole to expand in both the first direction and the second direction.

In another aspect, a sole structure for an article of footwear includes an outsole having a structure comprised of a pattern of hexagonal patterns. The outsole defines a plane. The hexagonal patterns comprise polygonal apertures surrounded by triangular portions joined to each other by joints that function as hinges allowing the triangular portions to rotate with respect to each other. When the outsole is under tension in a first direction, the outsole expands in both the first direction and in a second direction that is orthogonal to the first direction and is in the plane of the sole structure.

In another aspect, an article of footwear includes an upper and a sole structure, where the sole structure comprises an outsole, the outsole being characterized by having polygonal portions surrounding polygonal apertures. The polygonal portions are hingedly joined to adjoining polygonal portions such that a plurality of the polygonal portions rotate with respect to each other when the sole structure is under tension. When a portion of the outsole is under longitudinal tension it expands in both the longitudinal direction and the lateral direction and when the portion of the outsole is under lateral tension it expands in both the lateral direction and the longitudinal direction.

In another aspect, an article of footwear includes an outsole that includes a pattern of polygonal apertures formed by triangular portions surrounding the polygonal apertures. The polygonal apertures have a center. The triangular portions are joined at their vertices such that they function as hinges thereby allowing the triangles to rotate with respect to each other. The outsole is characterized by having a lateral direction, a longitudinal direction and a vertical direction. When a portion of the outsole is under lateral tension, it expands in both the lateral direction and the longitudinal direction, and when a portion of the outsole is under longitudinal tension it expands in both the longitudinal direction and the lateral direction. When a portion of the outsole is under vertical compression, the triangular portions are forced towards the center of the polygonal apertures.

In another aspect, an auxetic structure includes a pattern of polygonal apertures characterized by having at least three reentrant sides and having a center. The auxetic structure has a longitudinal direction and a lateral direction and a thickness. Under longitudinal tension the auxetic structure expands in both the longitudinal direction and the lateral direction. Under lateral tension the auxetic structure expands in both the lateral and longitudinal directions. Under vertical compression the polygonal apertures collapse towards their centers.

In another aspect, a sheet of material has a longitudinal direction, a lateral direction and a vertical direction. The sheet of material also include a pattern of hexagonal structures having apertures surrounded by triangular portions, where each triangular portion is joined to an adjoining triangular portion by a flexible joint such that the triangular portions can rotate with respect to each other. When the sheet of material is under tension in the longitudinal direction it expands in both the longitudinal direction and the lateral direction.

In another aspect, a composite auxetic material includes a first layer of relatively hard material comprising a pattern of polygonal apertures surrounded by polygonal portions, where each polygonal portion is joined to an adjoining polygonal feature by a flexible joint such that the polygonal portions may rotate with respect to each other when the first layer is under tension. The material further includes a second layer of relatively resilient material attached to the first layer, where the second layer has the same pattern of polygonal apertures as the first layer and wherein the pattern of polygonal apertures in the second layer is aligned with the pattern of polygonal apertures in the first layer. When the composite auxetic material is under tension in a first direction, it expands in both the first direction and in a second direction that is orthogonal to the first direction.

Other systems, methods, features and advantages of the embodiments will be, or will become, apparent to one of ordinary skill in the art upon examination of the following figures and detailed description. It is intended that all such additional systems, methods, features and advantages be included within this description and this summary, be within the scope of the embodiments, and be protected by the following claims.

BRIEF DESCRIPTION OF THE DRAWINGS

The embodiments can be better understood with reference to the following drawings and description. The components in the figures are not necessarily to scale, emphasis instead being placed upon illustrating the principles of the embodiments. Moreover, in the figures, like reference numerals designate corresponding parts throughout the different views.

DETAILED DESCRIPTION

For clarity, the detailed descriptions herein describe certain exemplary embodiments, but the disclosure herein may be applied to any article of footwear comprising certain of the features described herein and recited in the claims. In particular, although the following detailed description discusses exemplary embodiments, in the form of footwear such as running shoes, jogging shoes, tennis, squash or racquetball shoes, basketball shoes, sandals and flippers, the disclosures herein may be applied to a wide range of footwear.

For consistency and convenience, directional adjectives are employed throughout this detailed description corresponding to the illustrated embodiments. The term "longitudinal direction" as used throughout this detailed description and in the claims refers to a direction extending a length (or longest dimension) of an article of footwear such as a sports or recreational shoe. Also, the term "lateral direction" as used throughout this detailed description and in the claims refers to a direction extending along a width of an article of footwear. The lateral direction may generally be perpendicular to the longitudinal direction. The term "vertical direction" as used with respect to an article of footwear throughout this detailed description and in the claims refers to the direction that is normal to the plane of the sole of the article of footwear.

The term "sole structure", also referred to simply as "sole", herein shall refer to any combination that provides support for a wearer's foot and bears the surface that is in direct contact with the ground or playing surface, such as a single sole; a combination of an outsole and an inner sole; a combination of an outsole, a midsole and an inner sole, and a combination of an outer covering, an outsole, a midsole and an inner sole.

Figure 1:
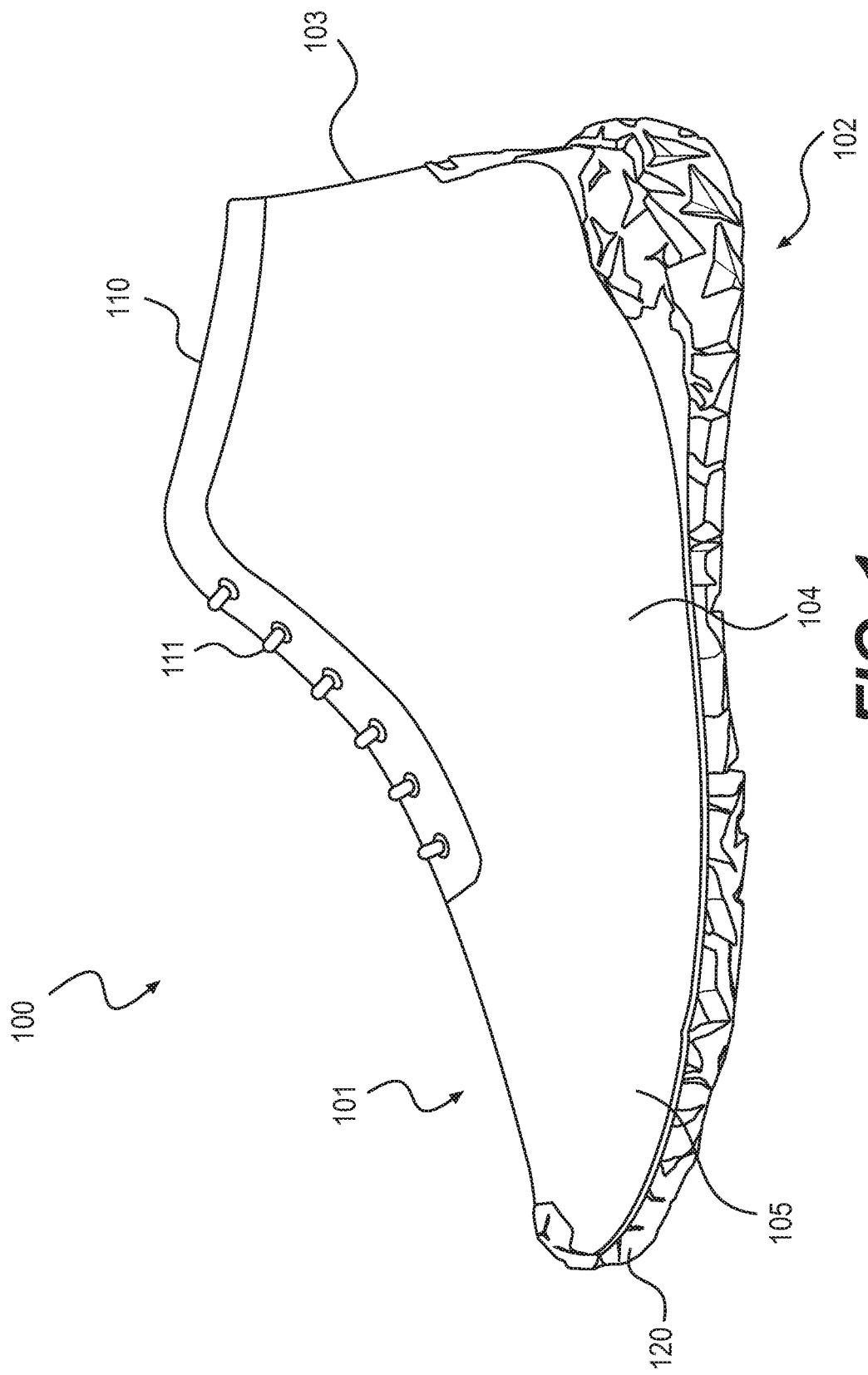
FIG. 1 is a schematic diagram of a side view of an embodiment of an article of footwear with an example of a sole with an auxetic structure.

FIG. 1 is a side perspective view of an embodiment of an article of footwear 100. Article of footwear 100 may include upper 101 and sole structure 102, also referred to hereafter simply as sole 102. Upper 101 has a heel region 103, an instep or midfoot region 104 and a forefoot region 105. Upper 101 may include an opening or throat 110 that allows the wearer to insert his or her foot into the footwear. In some embodiments, upper 101 may also include laces 111, which can be used to tighten or otherwise adjust upper 101 around a foot.

In some embodiments, sole 102 includes at least an outsole 120 that may be the primary ground-contacting surface. In some embodiments, sole 102 may also have an inner sole, a midsole, or both an inner sole and a midsole. In some embodiments, outsole 120 may bear a tread pattern, or may have cleats, spikes or other ground-engaging protuberances.

Figure 2:
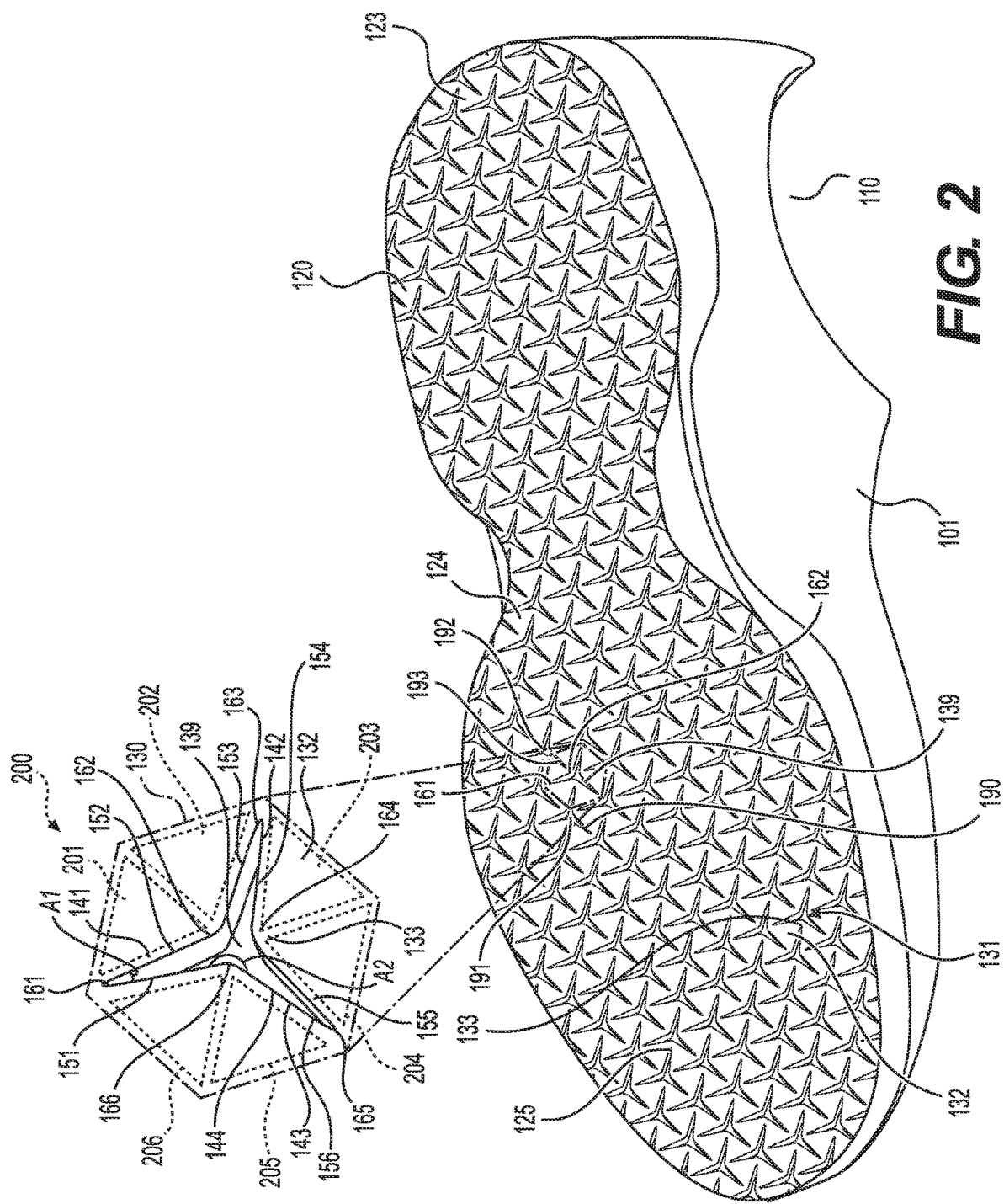
FIG. 2 is a schematic diagram of a bottom perspective view of an embodiment of the article of footwear shown in FIG. 1.

FIG. 2 is a bottom perspective view of an embodiment of an article of footwear. This figure shows the bottom of outsole 120. Outsole 120 has a heel region 123, an instep or midfoot region 124, and a forefoot region 125 as shown in FIG. 2. Outsole 120 has apertures surrounded by polygonal features that are joined to each other at their vertices. The joints at the vertices function as hinges, allowing the polygonal features to rotate as the sole is placed under tension. This action allows the portion of the sole under tension to expand both in the direction under tension and in the direction in the plane of the sole that is orthogonal to the direction under tension. Thus, these apertures and polygonal features form an auxetic structure for outsole 120, which is described in further detail below.

As shown in FIG. 2, outsole 120 comprises an approximately flat surface that includes a plurality of apertures 131, also referred to simply as apertures 131 hereafter. As an example, an enlarged view of first aperture 139 of apertures 131 is shown schematically within FIG. 2. First aperture 139 is further depicted as having a first portion 141, a second portion 142, and a third portion 143. Each of these portions is joined together at a central portion 144. Similarly, in some embodiments, each of the remaining apertures in apertures 131 may include three portions that are joined together, and extend outwardly from, a central portion.

Generally, each aperture in plurality of apertures 131 may have any kind of geometry. In some embodiments, an aperture may have a polygonal geometry, including a convex and/or concave polygonal geometry. In such cases, an aperture may be characterized as comprising a particular number of vertices and edges (or sides). In an exemplary embodiment, apertures 131 may be characterized as having six sides and six vertices. For example, aperture 139 is shown as having first side 151, second side 152, third side 153, fourth side 154, fifth side 155 and sixth side 156. Additionally, aperture 139 is shown as having a first vertex 161, second vertex 162, third vertex 163, fourth vertex 164, fifth vertex 165 and sixth vertex 166.

In one embodiment, the shape of aperture 139 (and correspondingly of one or more of apertures 131) may be characterized as a regular polygon, which is both cyclic and equilateral. In some embodiments, the geometry of aperture 139 can be characterized as triangles with sides that, instead of being straight, have an inwardly-pointing vertex at the midpoint of the side. The reentrant angle formed at these inwardly-pointing vertices can range from 180° (when the side is perfectly straight) to, for example, 120° or less.

Other geometries are also possible, including a variety of polygonal and/or curved geometries. Exemplary polygonal shapes that may be used with one or more of apertures 131 include, but are not limited to: regular polygonal shapes (e.g., triangular, rectangular, pentagonal, hexagonal, etc.) as well as irregular polygonal shapes or non-polygonal shapes. Other geometries could be described as being quadrilateral, pentagonal, hexagonal, heptagonal, octagonal or other polygonal shapes with reentrant sides.

In the exemplary embodiment, the vertices of an aperture (e.g., aperture 139) may correspond to interior angles that are less than 180 degrees or interior angles that are greater than 180 degrees. For example, with respect to aperture 139, first vertex 161, third vertex 163 and fifth vertex 165 may correspond to interior angles that are less than 180 degrees. In this particular example, each of first vertex 161, third vertex 163 and fifth vertex 165 has an interior angle A1 that is less than 180 degrees. In other words, aperture 139 may have a locally convex geometry at each of these vertices (relative to the outer side of aperture 139). In contrast, second vertex 162, fourth vertex 164 and sixth vertex 166 may correspond to interior angles that are greater than 180 degrees. In other words, aperture 139 may have a locally concave geometry at each of these vertices (relative to the outer side of aperture 139). In this particular example, each of second vertex 162, fourth vertex 164 and sixth vertex 166 may correspond to interior angles that are greater than 180 degrees.

Although the embodiments depict apertures having approximately polygonal geometries, including approximately point-like vertices at which adjoining sides or edges connect, in other embodiments some or all of an aperture could be non-polygonal. In particular, in some cases, the outer edges or sides of some or all of an aperture may not be joined at vertices, but may be continuously curved. Moreover, some embodiments can include apertures having a geometry that includes both straight edges connected via vertices as well as curved or non-linear edges without any points or vertices.

In some embodiments, apertures 131 may be arranged in a regular pattern on outsole 120. In some embodiments, apertures 131 may be arranged such that each vertex of an aperture is disposed near the vertex of another aperture (e.g., an adjacent or nearby aperture). More specifically, in some cases, apertures 131 may be arranged such that every vertex that has an interior angle less than 180 degrees is disposed near a vertex that has an interior angle greater than 180 degrees. As one example, first vertex 161 of aperture 139 is disposed near, or adjacent to, a vertex 191 of another aperture 190. Here, vertex 191 is seen to have an interior angle that is greater than 180 degrees, while first vertex 161 has an interior angle that is less than 180 degrees. Similarly, second vertex 162 of aperture 139 is disposed near, or adjacent to, a vertex 193 of another aperture 192. Here, vertex 193 is seen to have an interior angle that is less than 180 degrees, while second vertex 162 has an interior angle that is greater than 180 degrees.

The configuration resulting from the above arrangement may be seen to divide sole structure 120 into smaller geometric portions, whose boundaries are defined by the edges of apertures 131. In some embodiments, these geometric portions may be comprised of polygonal portions. For example, in the exemplary embodiment, apertures 131 are arranged in a manner that defines a plurality of polygonal portions 200, also referred to hereafter simply as polygonal portions 200.

Generally, the geometry of polygonal portions 200 may be defined by the geometry of apertures 131 as well as their arrangement on outsole 120. In the exemplary configuration, apertures 131 are shaped and arranged to define a plurality of approximately triangular portions, with boundaries defined by edges of adjacent apertures. Of course, in other embodiments polygonal portions could have any other shape, including rectangular, pentagonal, hexagonal, as well as possibly other kinds of regular and irregular polygonal shapes. Furthermore, it will be understood that in other embodiments, apertures may be arranged on an outsole to define geometric portions that are not necessarily polygonal (e.g., comprised of approximately straight edges joined at vertices). The shapes of geometric portions in other embodiments could vary and could include various rounded, curved, contoured, wavy, nonlinear as well as any other kinds of shapes or shape characteristics.

As seen in FIG. 2, polygonal portions 200 may be arranged in regular geometric patterns around each aperture. For example, aperture 139 is seen to be associated with first polygonal portion 201, second polygonal portion 202, third polygonal portion 203, fourth polygonal portion 204, fifth polygonal portion 205 and sixth polygonal portion 206. Moreover, the approximately even arrangement of these polygonal portions around aperture 139 forms an approximately hexagonal shape that surrounds aperture 139.

In some embodiments, the various vertices of an aperture may function as a hinge. In particular, in some embodiments, adjacent portions of material, including one or more geometric portions (e.g., polygonal portions), may rotate about a hinge portion associated with a vertex of the aperture. As one example, each vertex of aperture 139 is associated with a corresponding hinge portion, which joins adjacent polygonal portions in a rotatable manner.

In the exemplary embodiment, aperture 139 includes hinge portion 210 (see FIG. 3), which is associated with vertex 161. Hinge portion 210 is comprised of a relatively small portion of material adjoining first polygonal portion 201 and sixth polygonal portion 206. As discussed in further detail below, first polygonal portion 201 and sixth polygonal portion 206 may rotate with respect to one another at hinge portion 210. In a similar manner, each of the remaining vertices of aperture 139 are associated with similar hinge portions that join adjacent polygonal portions in a rotatable manner.

Figure 3:
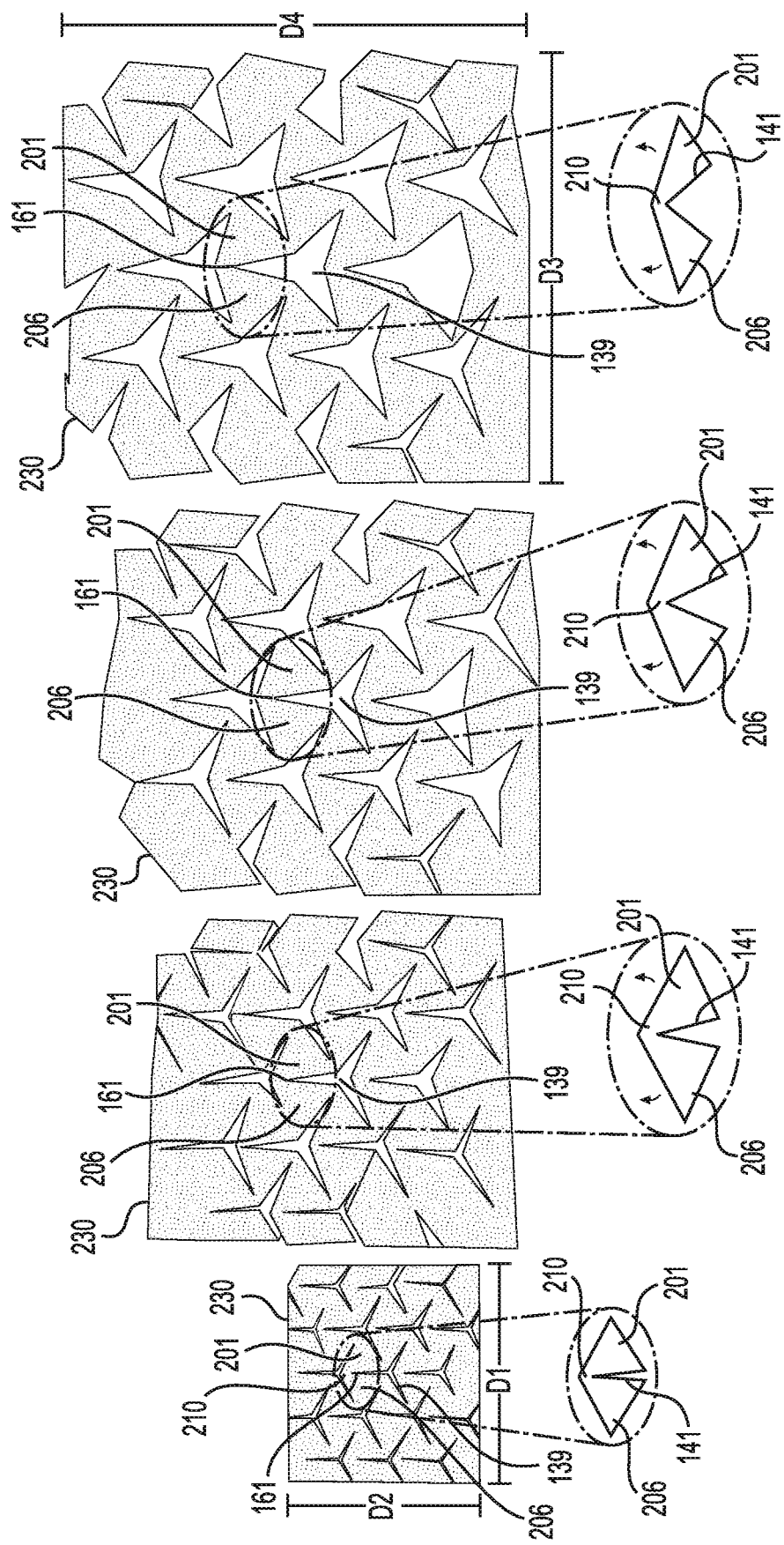
FIG. 3 shows a sequence of schematic diagrams of a bottom view of the portion of the outsole of FIG. 1 in various states of tension.

FIG. 3 illustrates a schematic sequence of configurations for a portion of outsole 120 under a tensioning force applied along a single axis or direction. Specifically, FIG. 3 is intended to illustrate how the geometric arrangements of apertures 131 and polygonal portions 200 provide auxetic properties to outsole 120, thereby allowing portions of outsole 120 to expand in both the direction of applied tension and a direction perpendicular to the direction of applied tension.

As shown in FIG. 3, a portion 230 of outsole 200 proceeds through various intermediate configurations as a result of an applied tension in a single linear direction (for example, the longitudinal direction). In particular, the four intermediate configurations may be associated with increasing levels of tension that is applied along a single direction.

Due to the specific geometric configuration for polygonal portions 200 and their attachment via hinge portions, this linear tension is transformed into rotation of adjacent polygonal portions 200. For example, first polygonal portion 201 and sixth polygonal portion 206 are rotated at hinge portion 210. All of the remaining polygonal portions 200 are likewise rotated as apertures 131 expand. Thus, the relative spacing between adjacent polygonal portions 200 increases. For example, as seen clearly in FIG. 3, the relative spacing between first polygonal portion 201 and sixth polygonal portion 206 (and thus the size of first portion 141 of aperture 131) increases with increased tension.

As the increase in relative spacing occurs in all directions (due to the symmetry of the original geometric pattern of apertures), this results the expansion of portion 230 along a first direction as well as along a second direction orthogonal to the first direction. For example, in the exemplary embodiment, in the initial or non-tensioned configuration (seen on the left in FIG. 3), portion 230 initially has an initial size D1 along a first linear direction (e.g., the longitudinal direction) and an initial size D2 along a second linear direction that is orthogonal to the first direction (e.g., the lateral direction). In the fully expanded configuration (seen on the right in FIG. 3), portion 230 has an increased size D3 in the first direction and an increased size D4 in the second direction. Thus, it is clear that the expansion of portion 230 is not limited to expansion in the tensioning direction. Moreover, in some embodiments, the amount of expansion (e.g., the ratio of the final size to the initial size) may be approximately similar between the first direction and the second direction. In other words, in some cases, portion 230 may expand by the same relative amount in, for example, both the longitudinal direction and the lateral direction. In contrast, some other kinds of structures and/or materials may contract in directions orthogonal to the direction of applied tension.

In the exemplary embodiments shown in the figures, an auxetic structure, including an outsole comprised of an auxetic structure may be tensioned in the longitudinal direction or the lateral direction. However, the arrangement discussed here for auxetic structures comprised of apertures surrounded by geometric portions provides a structure that can expand along any first direction along which tension is applied, as well as along a second direction that is orthogonal to the first direction. Moreover, it should be understood that the directions of expansion, namely the first direction and the second direction, may generally be tangential to a surface of the auxetic structure. In particular, the auxetic structures discussed here may generally not expand substantially in a vertical direction that is associated with a thickness of the auxetic structure.

Figure 4:
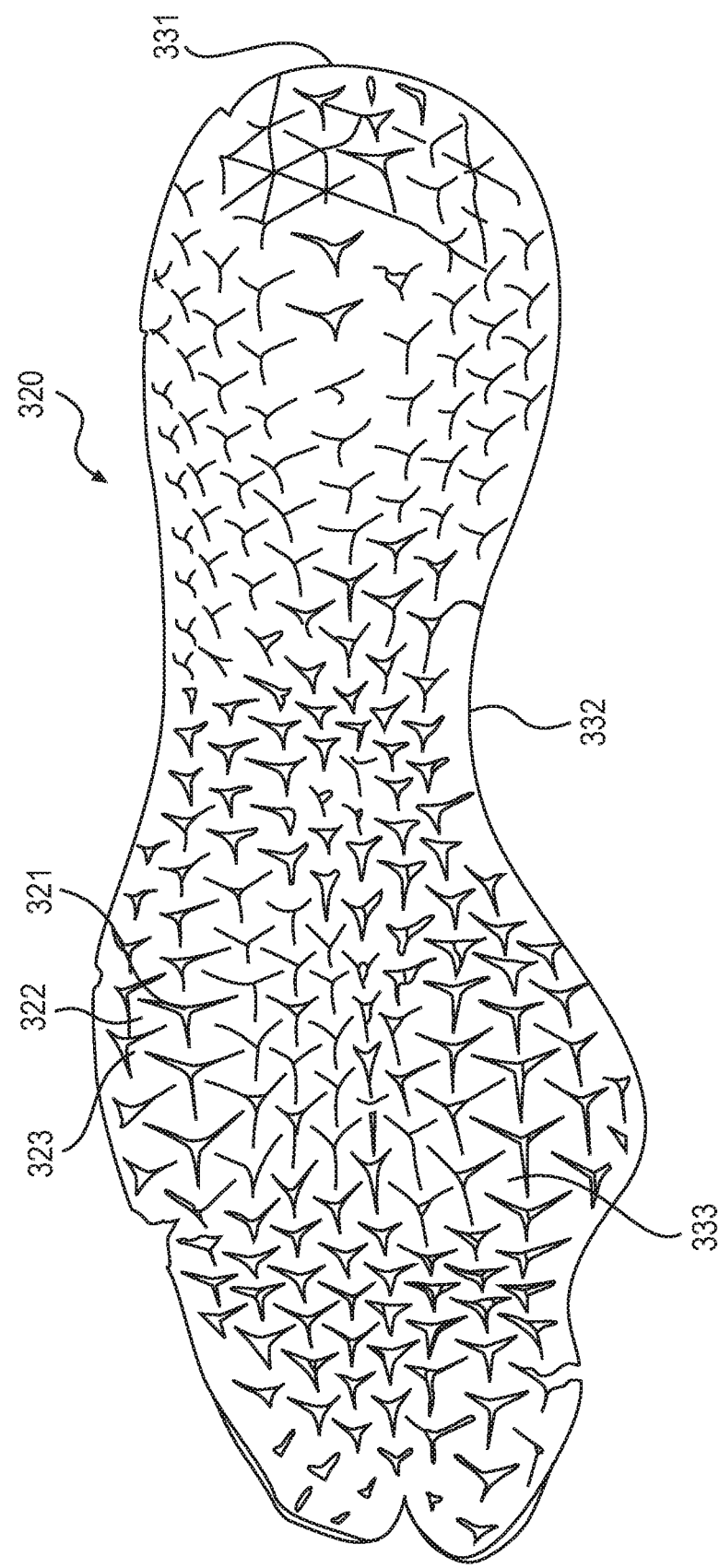
FIG. 4 is a schematic diagram of a top view of an embodiment of an outsole with the upper removed.
Figure 5:
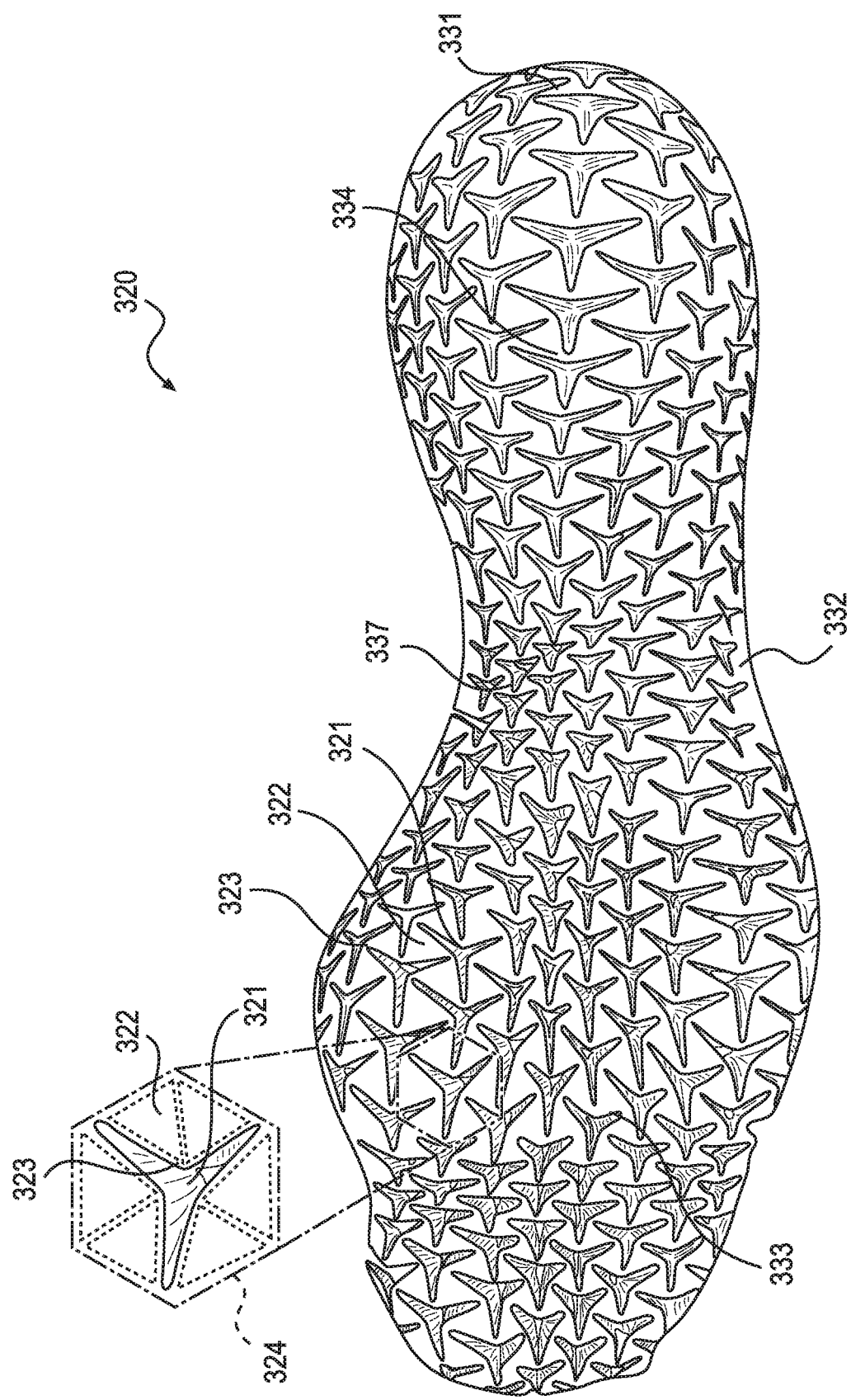
FIG. 5 is a schematic diagram of a bottom view of the outsole shown in FIG. 4.

FIG. 4 is a top view of the side of outsole 320 that is not in contact with the ground. FIG. 5 is a bottom view of the outsole of FIG. 4. Thus FIG. 5 is a view of the side of outsole 320 that is in direct contact with the ground. Outsole 320 has a heel region 331, a midfoot or instep region 332 and a forefoot region 333. In some embodiments, outsole 320 may be comprised of an auxetic structure. As shown in these figures, outsole 320 bears a pattern of apertures 321 formed by a pattern of triangular portions 322 that are joined at each of their vertices 323 to the vertices of adjoining triangles. The combination of six triangles 322 (depicted in dashed lines in the blow-out in FIG. 5) around each of the apertures 321 forms hexagonal patterns 324 (depicted in dash-dot lines in FIG. 5) as shown in FIG. 5.

As shown in FIG. 5, the hexagonal patterns vary in size and shape over the length and width of the outsole. For example, the size of the hexagonal patterns is largest in the center 334 of the heel region 331 and smallest at the instep region 337. For example, the distance from one vertex of an aperture to an adjoining vertex of that aperture may be twice as great in the center of the heel region than at the instep region of the sole. At the heel, in an exemplary embodiment, the reentrant angle for the side of the triangle that is generally oriented laterally is quite shallow at about 150° to 170°, for example at 160°, whereas at the forefoot, that reentrant angle is much sharper, at about 110° to 130°, for example at 120°. More generally, the reentrant angles may range from 100° to 170°. With this geometry, the auxetic structure at the heel expands in width under longitudinal tension to a greater degree than it expands in length when under lateral tension. At the forefoot, the reentrant angles do not differ as much, so that the expansion in width under longitudinal tension at the forefoot is not that much greater than the expansion in length under lateral tension.

In the example shown in FIGS. 4 and 5, the geometrical patterns form through-hole apertures 321, such that apertures 321 form holes all the way through the outsole 320. However, in other embodiments, outsole 320 need not include through-hole apertures. Instead, outsole 320 may include blind holes such that there is a thin continuous layer of material at the top or at the bottom of the outsole. In yet other embodiments, the geometrical patterns may form through-holes in certain portions of the outsole and blind holes in other portions of the outsole.

Figure 6:
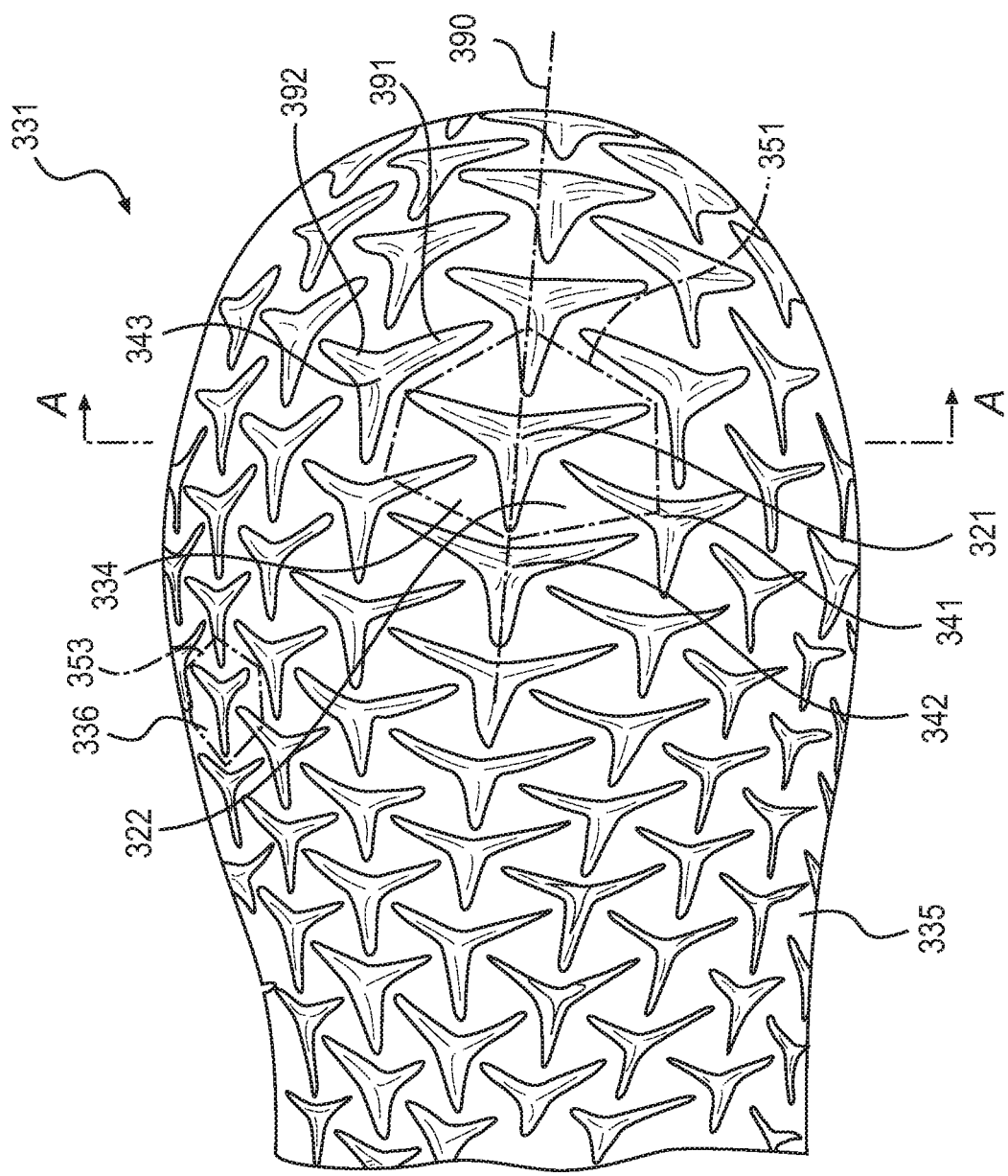
FIG. 6 is a schematic diagram of an enlarged view of the heel region of the outsole shown in FIG. 5 when it is not under tension.

FIG. 6 is an enlarged views of the heel region 331, the midfoot region 332 and the forefoot region 333, respectively, of the outsole shown in FIG. 5 when the outsole is not under tension. FIG. 6 shows that the hexagonal patterns formed by the combination of hinged triangles forming the apertures in the central portion 334 of heel region 331 are larger than the hexagonal patterns towards the lateral side 335 or the medial side 336 of heel region 331. For example, hexagonal pattern 351, which is disposed in central portion 334, may be larger than hexagonal pattern 353, which is disposed on medial side 336 of heel region 331. If the heel strikes the ground or playing surface in the direction that is normal to the ground, triangular portions 322 in central portion 334 of the heel move towards the center of the hexagonal pattern 351. This increases the density of the structure directly under the heel, and helps cushion the impact of the heel striking the ground.

In the embodiment shown in FIG. 6, the hexagonal patterns in the central portion 334 of the heel may be approximately symmetric with respect to a longitudinal axis that bisects the apertures 321 at the center of the hexagonal patterns. For example, aperture 342 is approximately symmetric with respect to axis 390 that bisects aperture 342. The features in the adjoining columns of apertures on either side of the central portion 334 of the heel, however, are not symmetric. For example, aperture 343 on the medial side of the heel has a longer inwardly-directed portion 391 than an outwardly-directed portion 392. Aperture 341 on the lateral side of the heel also has a similar geometry, with an inwardly directed portion that is longer than an outwardly directed portion of aperture 341. This geometry maximizes the ability of the central region to compress and attenuate impact forces when the heel strikes the ground or playing surface. In some embodiments, the dimensions of the features on the lateral side 335 of the heel and on the medial side 336 of the heel are significantly smaller (for example, two-thirds the size or smaller) than the dimensions of the features at the center of the heel. The smaller dimensions of the hexagonal patterns on the lateral and medial sides of the heel allow the heel to maintain its curved shape around the upwardly curving contour of the heel, and maximizes the flexibility of the medial and lateral sides of the heel.

Figure 7:
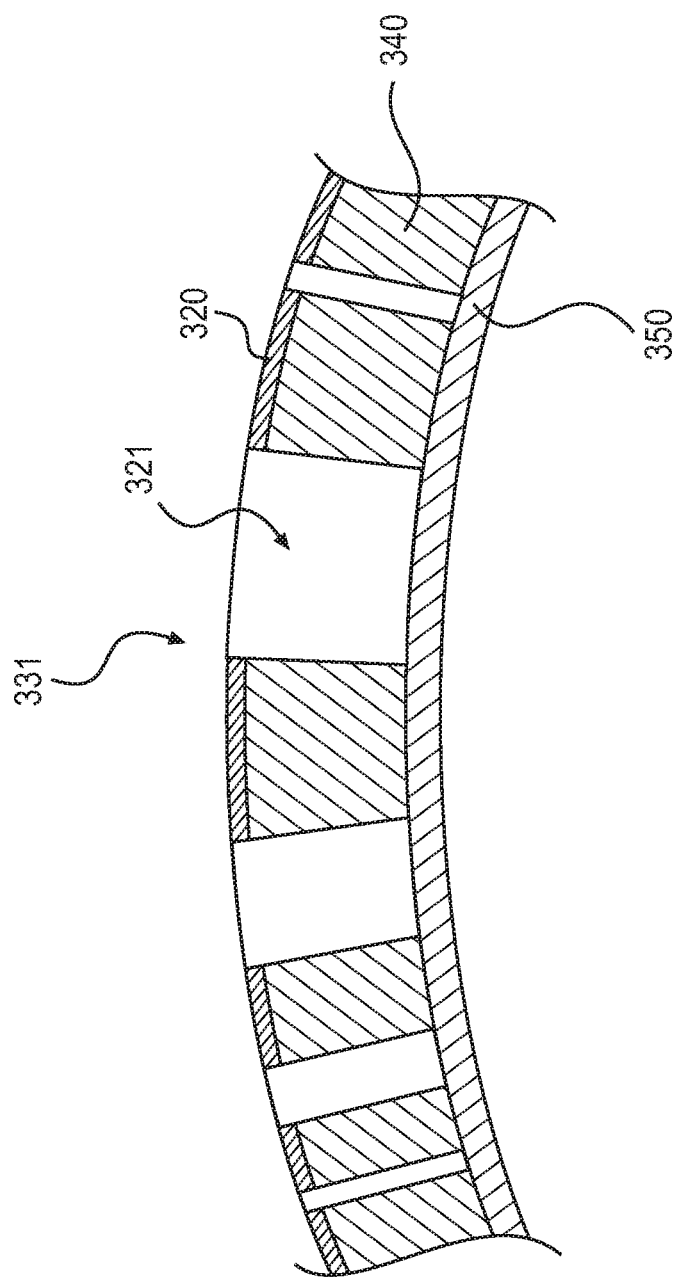
FIG. 7 is a schematic diagram of a cross-section along the line A-A identified in FIG. 6.

FIG. 7 is a cross-section taken at heel portion 331 shown in FIG. 6, showing an example of the construction of the footwear. In this example, the heel has three layers—an outsole layer 320, a midsole layer 340 and an insole layer 350. In some embodiments, outsole layer 320 is made of a relatively hard, abrasion resistant material, whereas midsole layer 340 and insole layer 350 are made of relatively resilient materials so as to provide a comfortable article of footwear. FIG. 7 also shows apertures 321 through outsole layer 320 and midsole layer 340.

Figure 8:
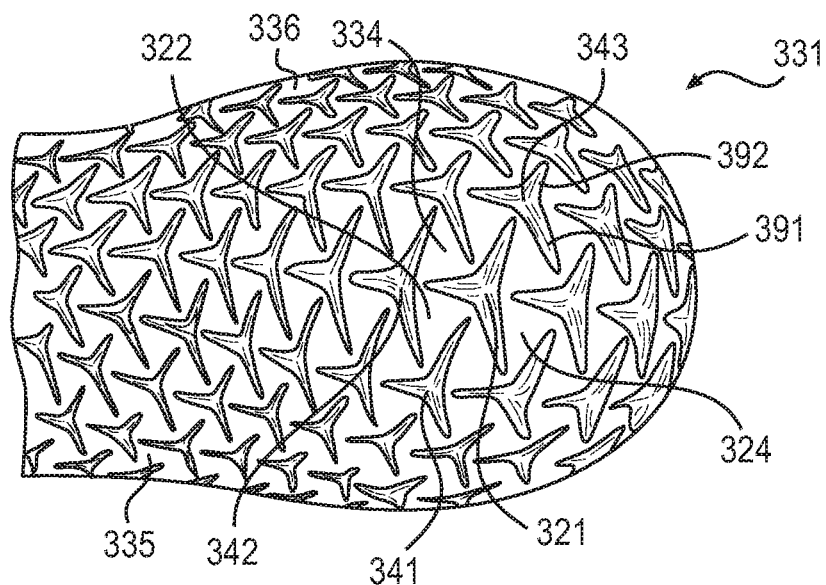
FIG. 8 is a schematic diagram of an enlarged view of the heel region shown in FIG. 5.
Figure 9:
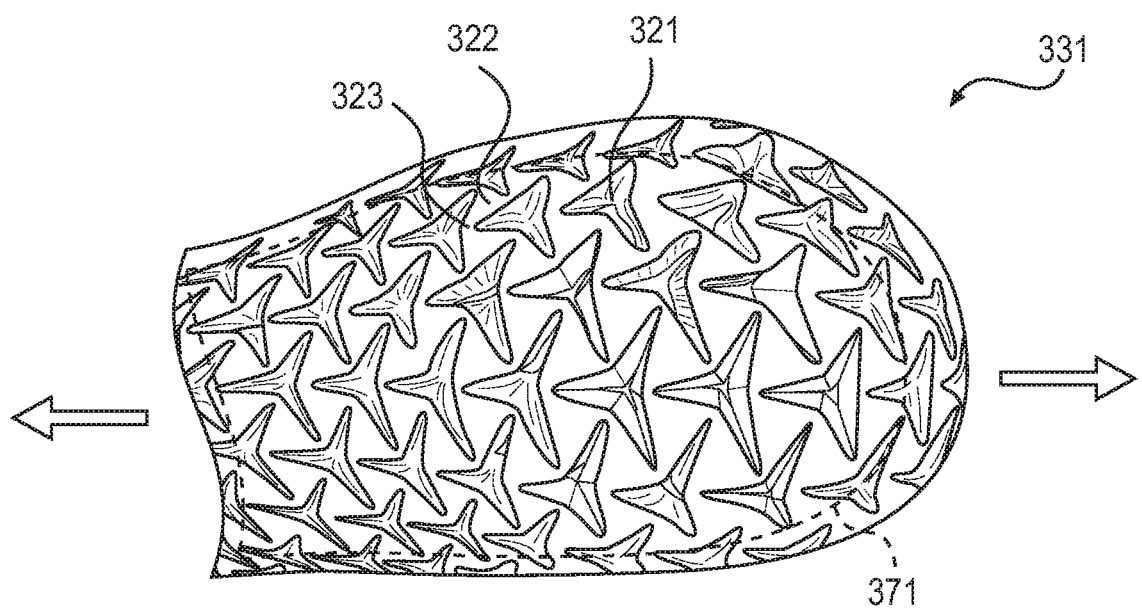
FIG. 9 is a schematic diagram of an enlarged view of the heel region shown in FIG. 5 when it is under longitudinal tension.

FIGS. 8-9 illustrates the auxetic characteristics of heel region 331 of outsole 320 as, for example, the wearer lands on the heel of the footwear. Under longitudinal tension, heel region 331 increases in length. However, because of the construction of outsole 320 as a pattern of hinged triangles joined at their vertices, heel region 331 increases in its lateral dimension as well (e.g., its width). For purposes of illustration, the initial size of heel region 331 prior to applying tension is indicated by line 371. This may help improve the traction between the heel and the playing surface for various reasons. For example, because the ground-contacting surface is spread over a somewhat larger area, this increases the likelihood that at least part of the heel will be in contact with a non-slippery playing surface when the heel hits the ground. Additionally, the openings between triangles allow the triangles to expand, increasing the area of contact with the ground. Furthermore, the impact opens the inner edges of the triangular star-shaped apertures so as to increase the engagement of the edges with the playing surface.

Figure 10:
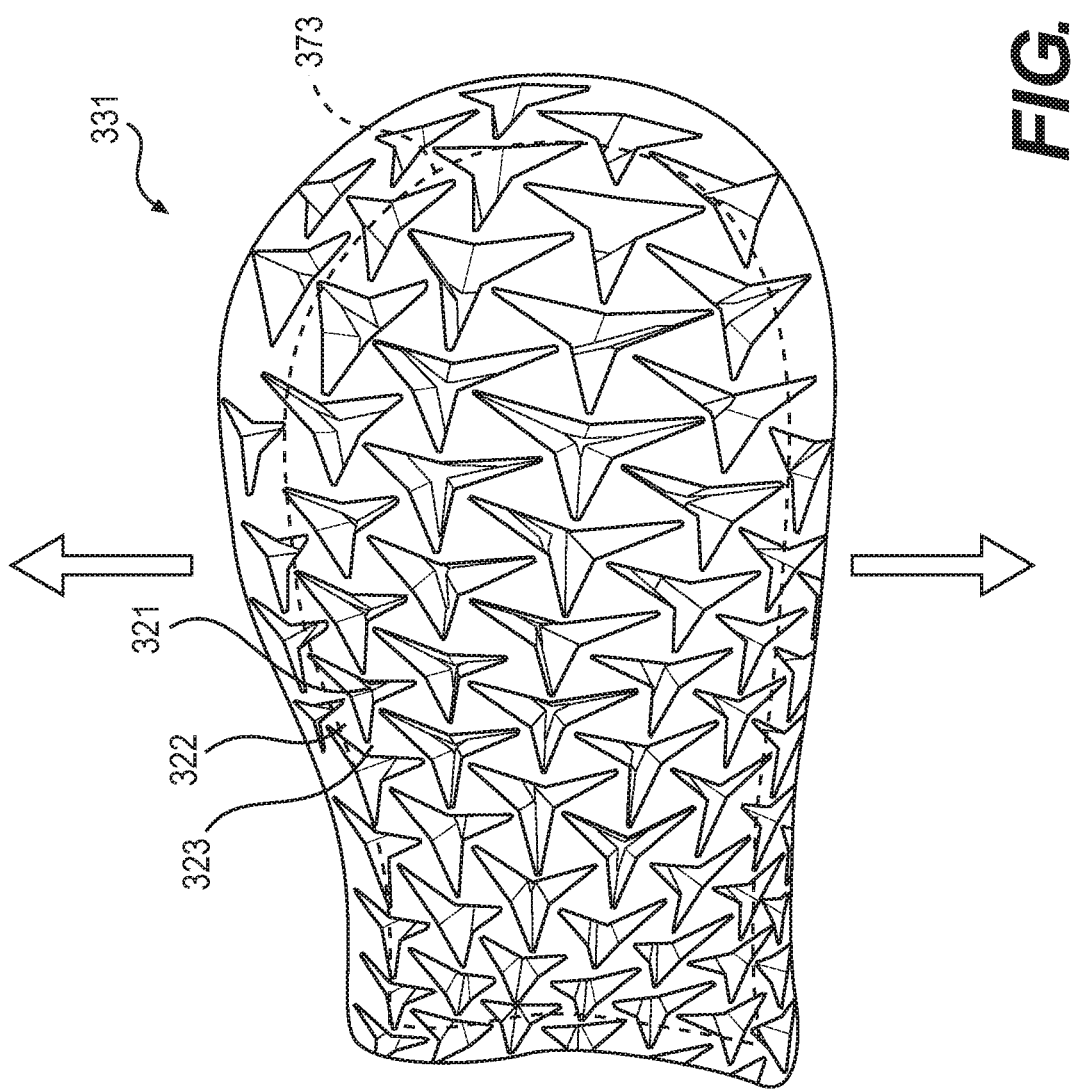
FIG. 10 is a schematic diagram of an enlarged view of the heel region shown in FIG. 5 when it is under lateral tension.

FIG. 10 is another view of the heel region shown in FIG. 8. In this case, the heel region 331 has undergone lateral tension. For that reason, the triangles have rotated and the dimensions of the heel region 331 have increased longitudinally as well as laterally. The dashed line 373 shows an outline of heel region 331 when it is not under tension. This configuration provides further improvements in traction when a wearer cuts sharply or pushes off to one side or the other.

Figure 11:
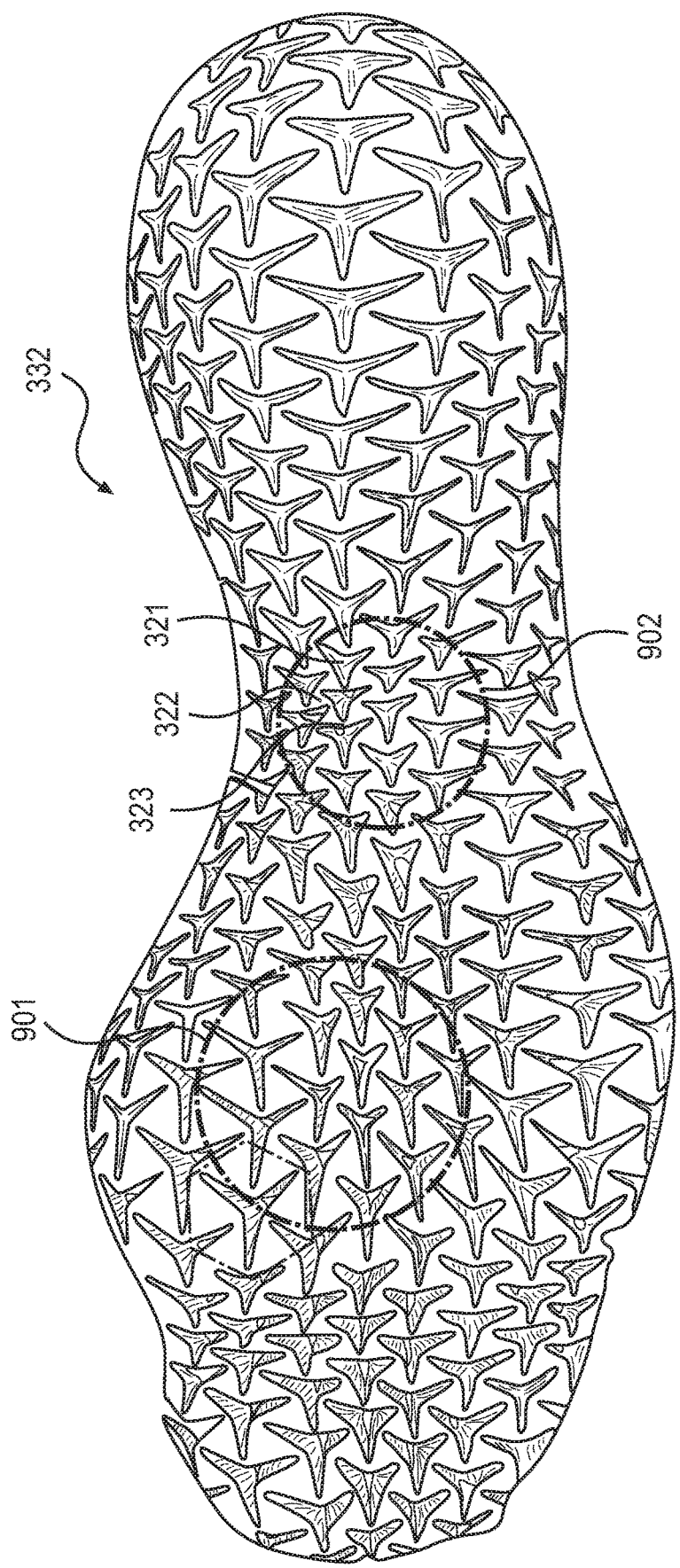
FIG. 11 is a schematic diagram of an embodiment of a sole when it is not under tension.

FIG. 11 is a schematic diagram of a sole showing apertures 321, formed by a pattern of triangular portions 322 that are joined to each other at their vertices 323. In some embodiments, apertures 321 may be characterized as triangular star-shaped apertures, due to the presence of three star-like arms extending from a central region. However, as previously discussed, apertures 321 are not limited to particular geometry, and could have any polygonal or non-polygonal geometry in other embodiments.

As noted above, the joints at the vertices function as hinges, allowing triangular portions 322 to rotate with respect to each other as the sole comes under tension. Area 901 and area 902, denoted by the dashed circles, are identified in FIG. 11 for further discussion with respect to FIGS. 12-14.

Figure 13:
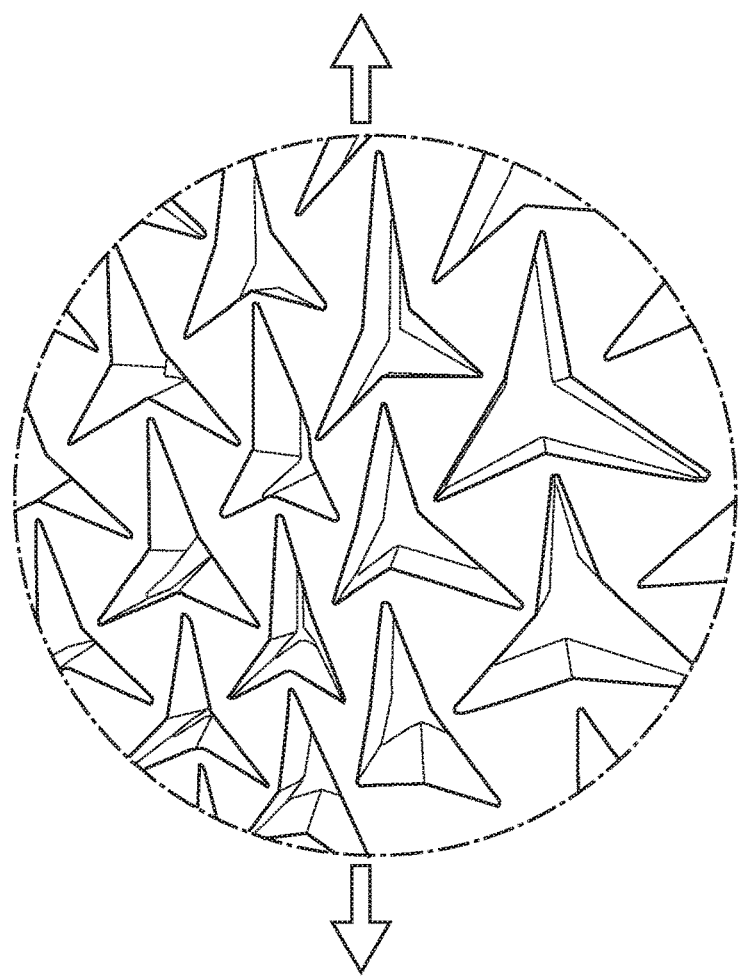
FIG. 13 is a schematic diagram of an enlarged view of a portion of the forefoot of the sole shown in FIG. 11 when it is under longitudinal tension.
Figure 12:
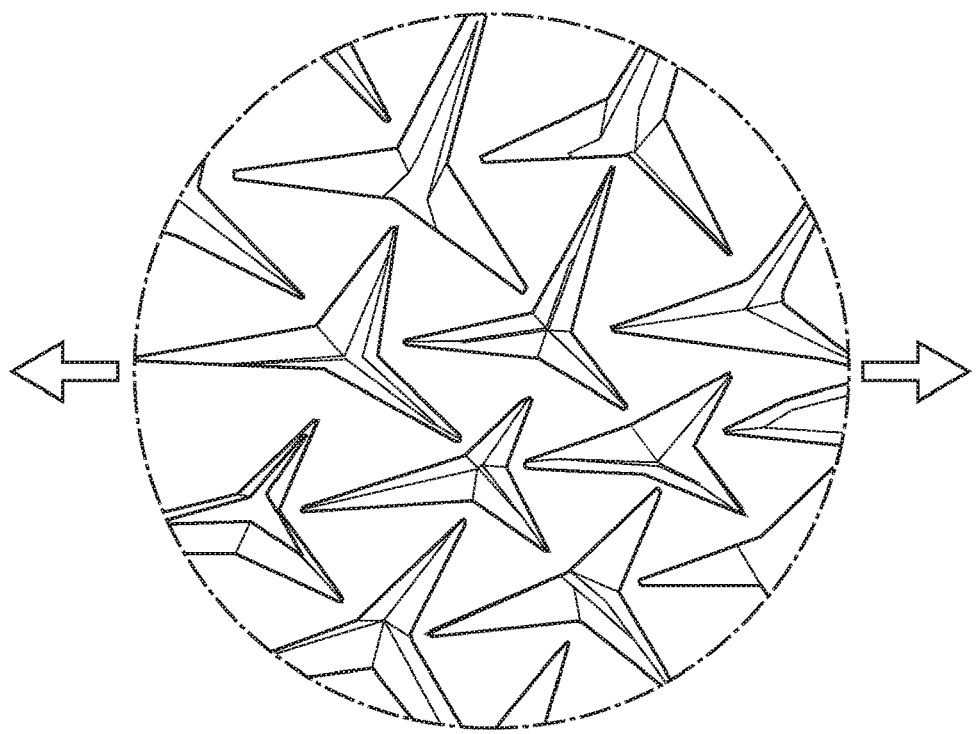
FIG. 12 is a schematic diagram of an enlarged view of a portion of the forefoot of the sole shown in FIG. 11 when it is under lateral tension.

FIG. 12 is an expanded view of the area identified as 901 in FIG. 11, when the forefoot is under lateral tension. As shown in FIG. 12, when the forefoot is under lateral tension, for example when the wearer is pushing off to the side, the outsole at the forefoot increases in dimension longitudinally as well as laterally, thus improving traction with the ground or playing surface. FIG. 13 is another expanded view of the area identified as 901 in FIG. 11, in this case illustrating the configuration of the sole when it is under longitudinal tension, for example when the wearer is pushing off from his or her forefoot. FIG. 13 shows that when the forefoot is under longitudinal tension, the outsole increases its lateral dimension as well as its longitudinal dimension.

Figure 14:
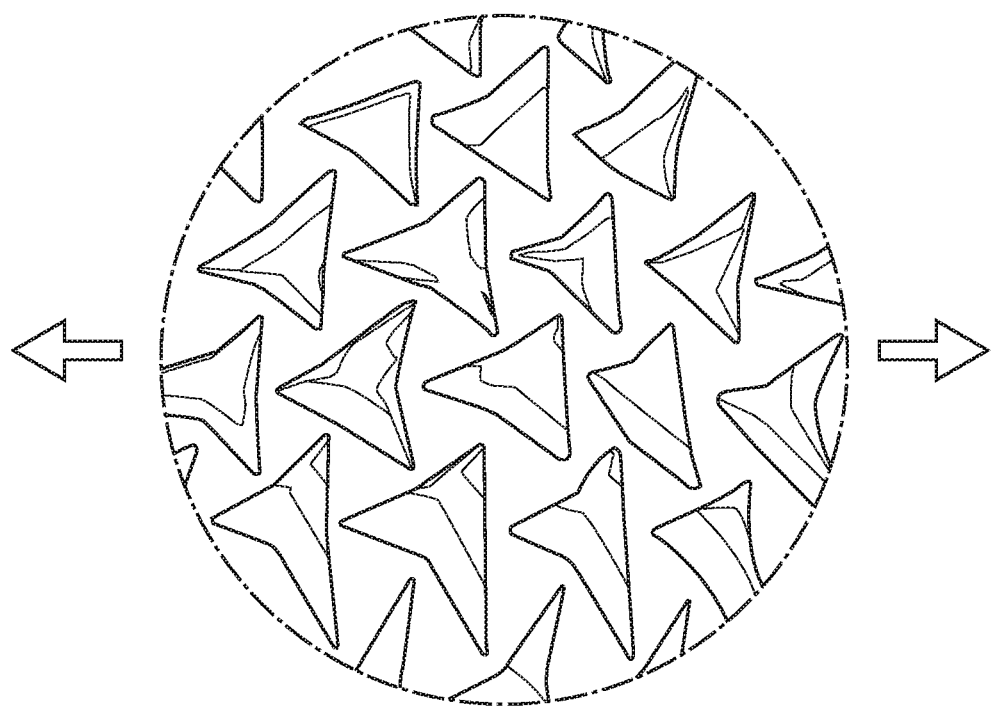
FIG. 14 is a schematic diagram of an enlarged view of a portion of the midfoot of the sole shown in FIG. 11 when it is under longitudinal tension.
Figure 15:
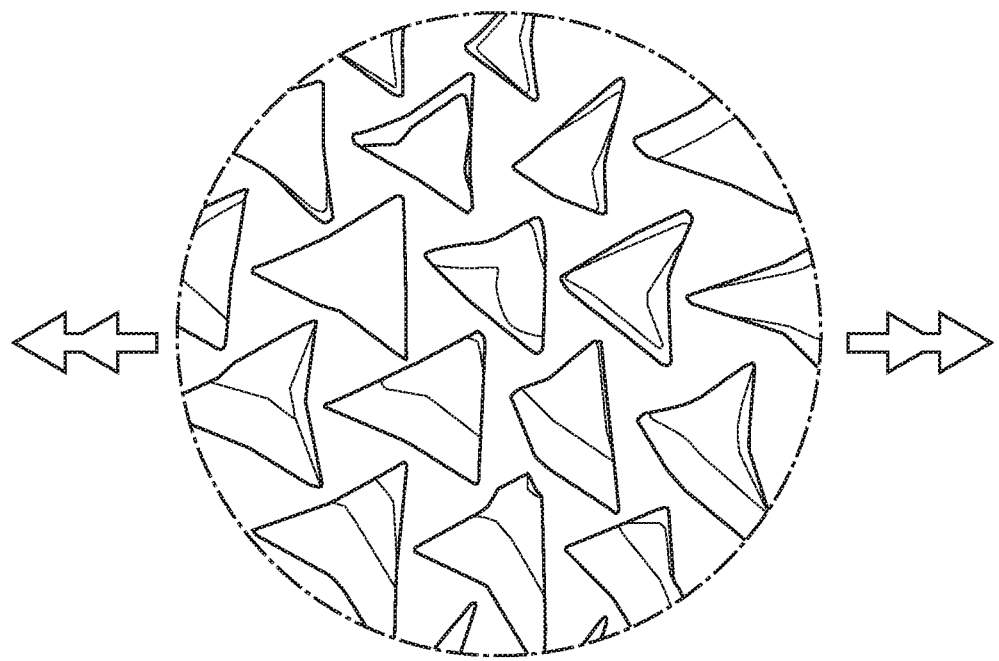
FIG. 15 is a schematic diagram of an enlarged view of a portion of the midfoot of the sole shown in FIG. 11 when it is under increased longitudinal tension.

FIG. 14 is an expanded view of the area identified as 902 in FIG. 11 when the midfoot of the sole is under moderate longitudinal tension, for example when the contact with the ground is transitioning from the heel to the forefoot. As shown in FIG. 14, when the midfoot of the sole is under longitudinal tension, it increases in its lateral dimension as well as in its longitudinal direction. FIG. 15 shows the midfoot when it is under even greater longitudinal tension, showing that the dimensions of the sole have increased laterally as well as longitudinally to an even greater extent.

Figure 16:
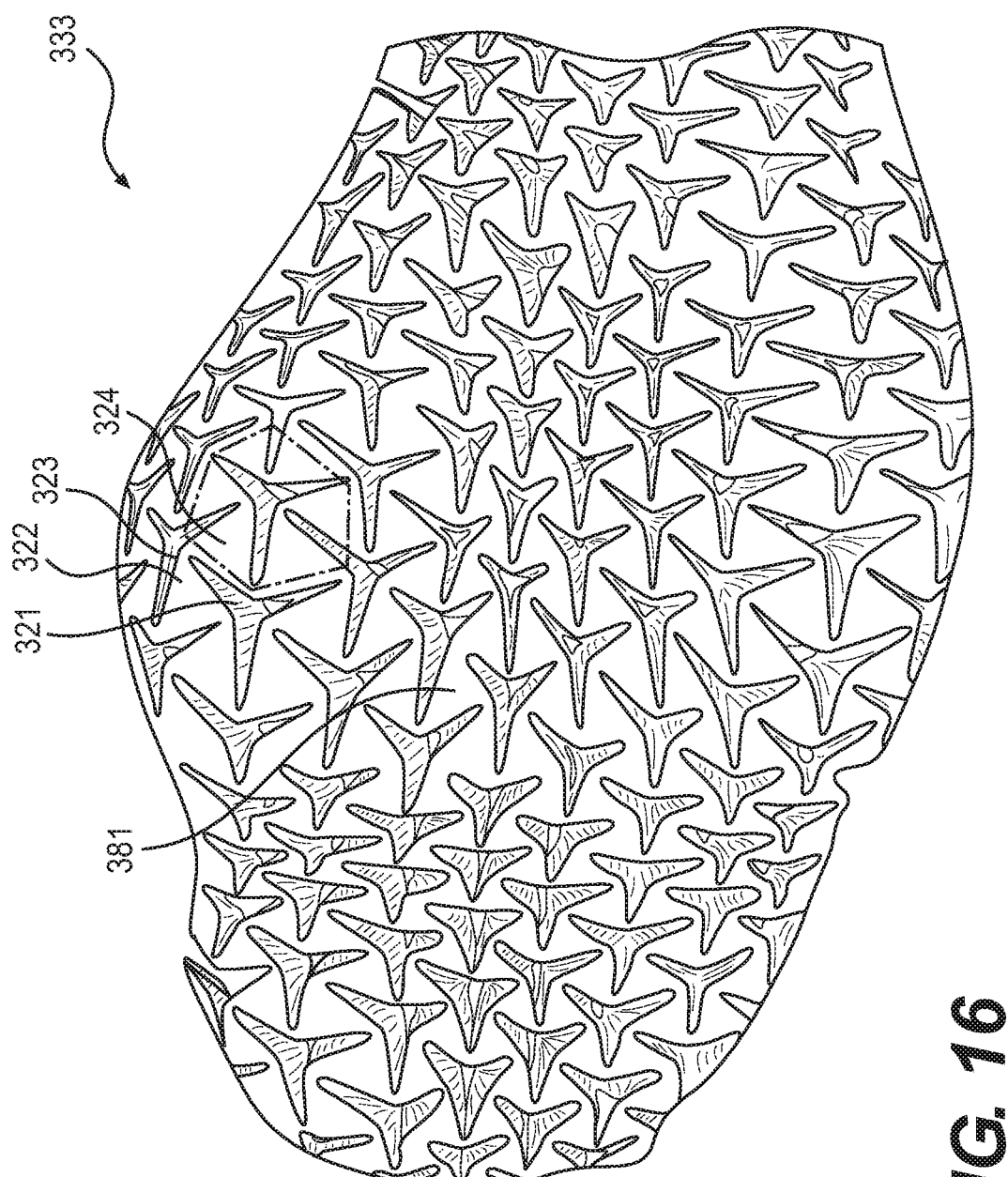
FIG. 16 is a schematic diagram of an enlarged view of the forefoot of the sole shown in FIG. 5 when it is not under tension.

FIG. 16 is an enlarged of the forefoot region 333 when the forefoot is in a rest condition and therefore not under tension. In the middle portion 381 of forefoot region 333, the outsole has larger hexagonal patterns 324 on its medial side of the ball of the foot (i.e., where the phalange from the big toe meets a metatarsal bone), where a wearer would be pushing off when making a sudden move to one side, and at the big toe where a wearer would be pushing off to leap or run forwards. These larger features help absorb the impact of these moves, and increase the traction of those regions of the outsole with the playing surface.

Figure 17:
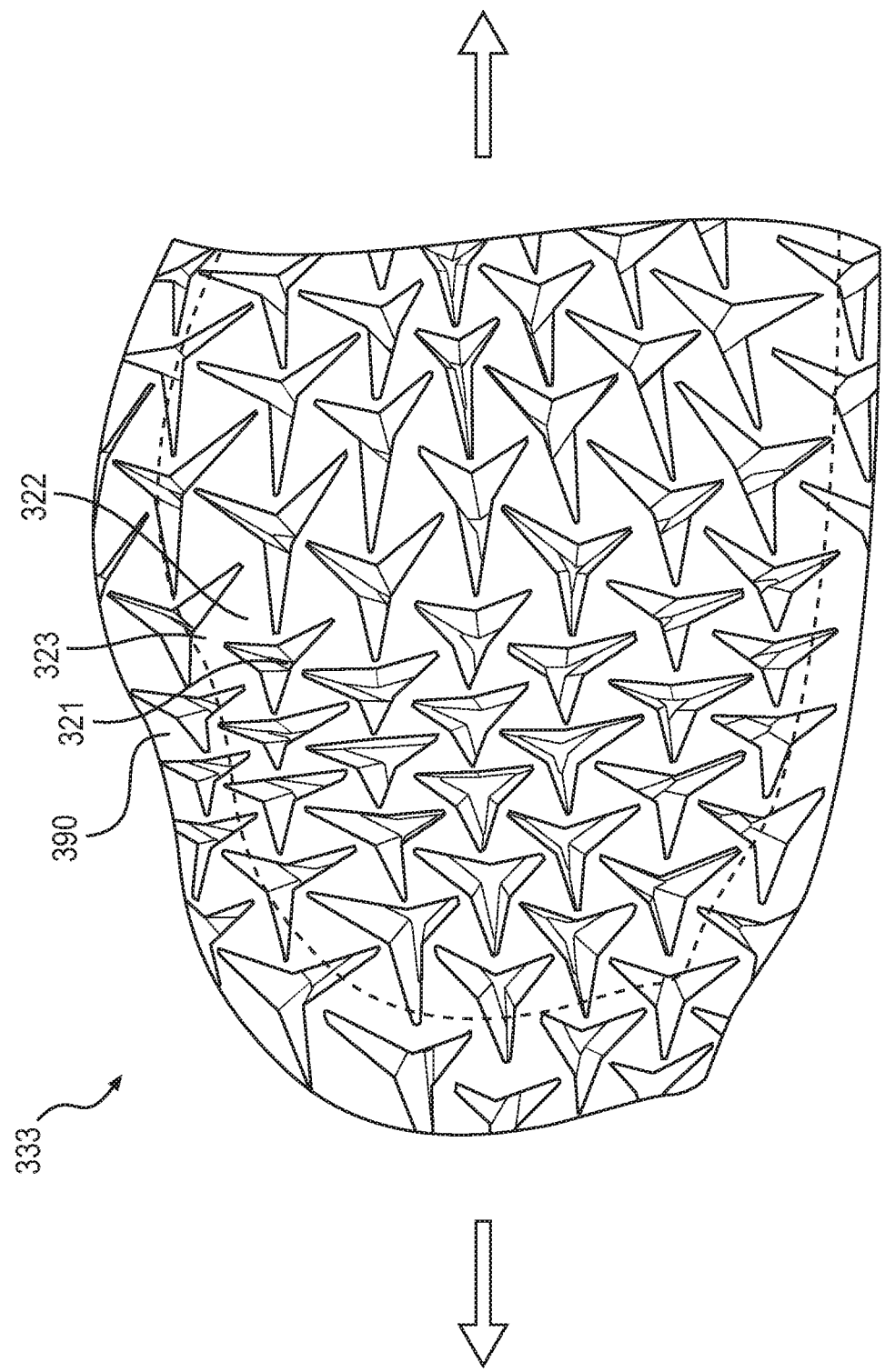
FIG. 17 is a schematic diagram of an enlarged view of the forefoot of the sole shown in FIG. 5 when it is under longitudinal tension.
Figure 18:
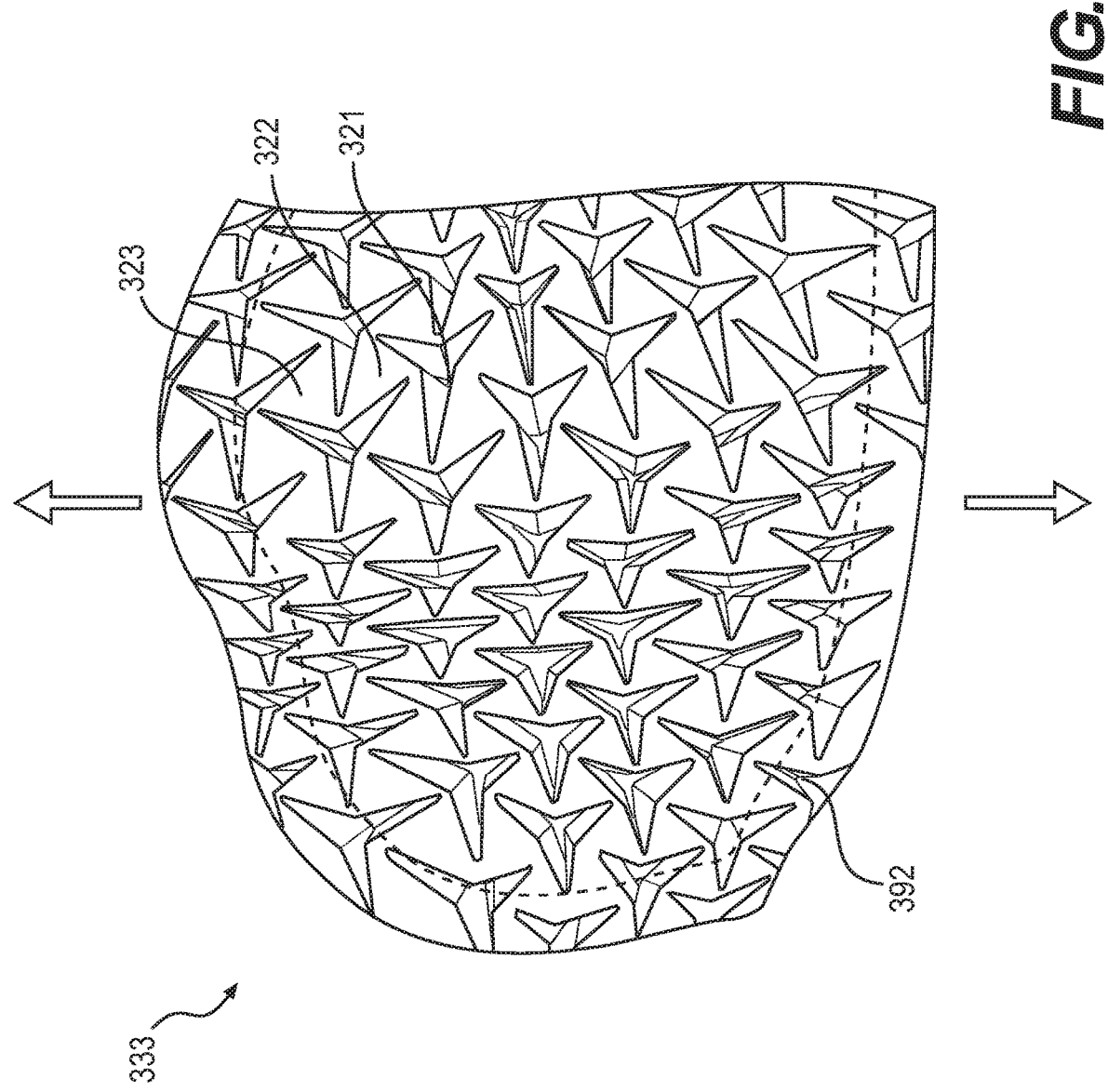
FIG. 18 is a schematic diagram of an enlarged view of the forefoot of the sole shown in FIG. 5 when it is under lateral tension.

FIG. 17 shows the forefoot region of FIG. 16 when it is under longitudinal tension, showing that the region under tension increases its lateral dimension as well as its longitudinal dimension. FIG. 18 shows the forefoot region of FIG. 16 when it is under lateral tension, showing that the region under tension increases its longitudinal dimensions as well as its lateral dimensions. As seen in FIGS. 17 and 18 the auxetic structure of the outsole provides improved traction when subjected to either longitudinal or lateral tension, since the overall surface area of the outsole increases under either kind of tension.

Figure 22:
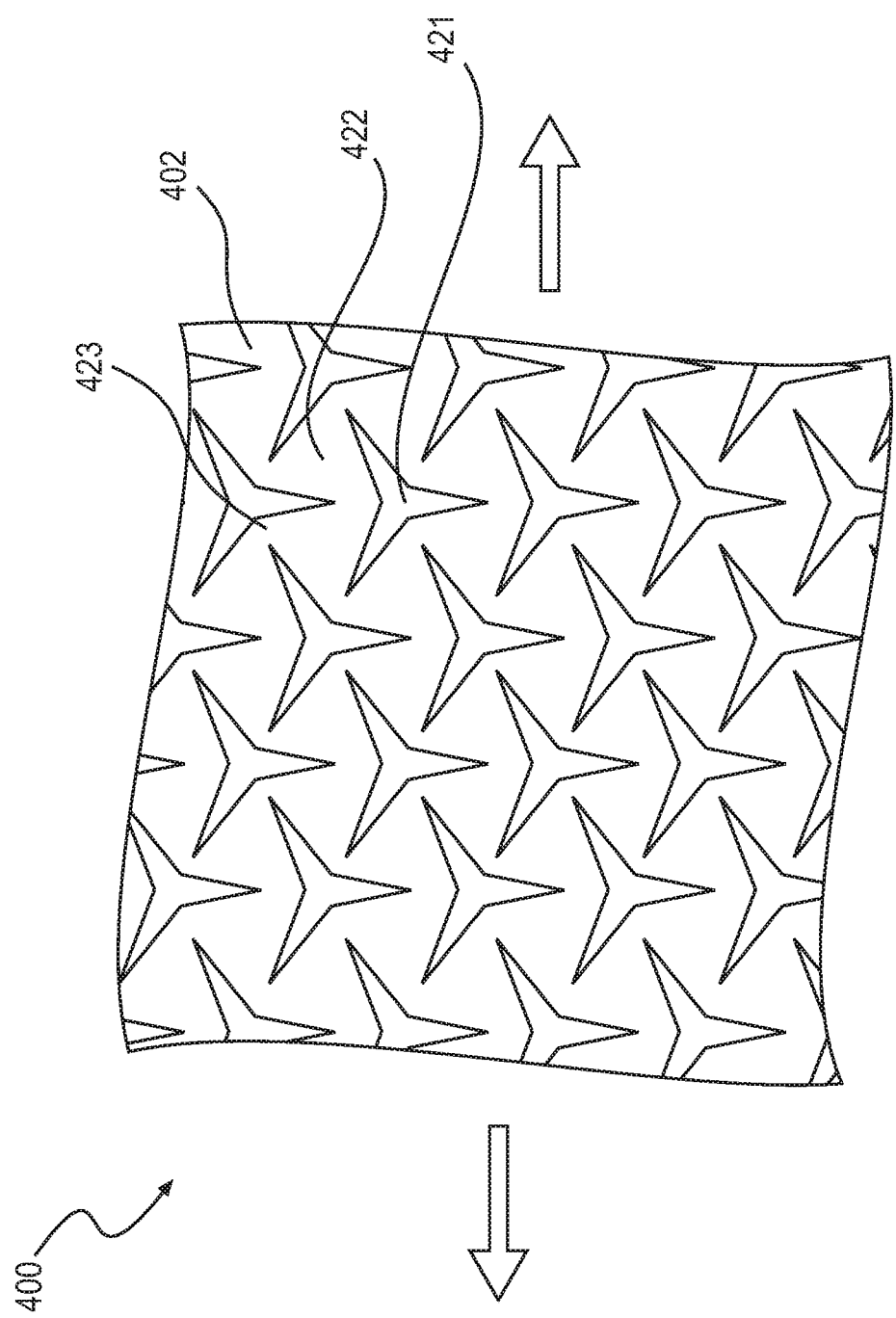
FIG. 22 is a schematic diagram of a top view of a portion of the outsole of FIG. 19 when it is under tension.

FIGS. 19 to 25 illustrate an embodiment with a different sole structure. In this embodiment, sole 400 is made from an auxetic structure that does not appear to have openings when the structure is not under tension. However, this structure exhibits polygonal openings when the structure is under tension. Thus this structure can be described as being "closed" when it is not under tension (FIGS. 19 and 21), and "open" when it is under longitudinal, lateral or other tension in the plane of the structure (FIG. 22).

Figure 19:
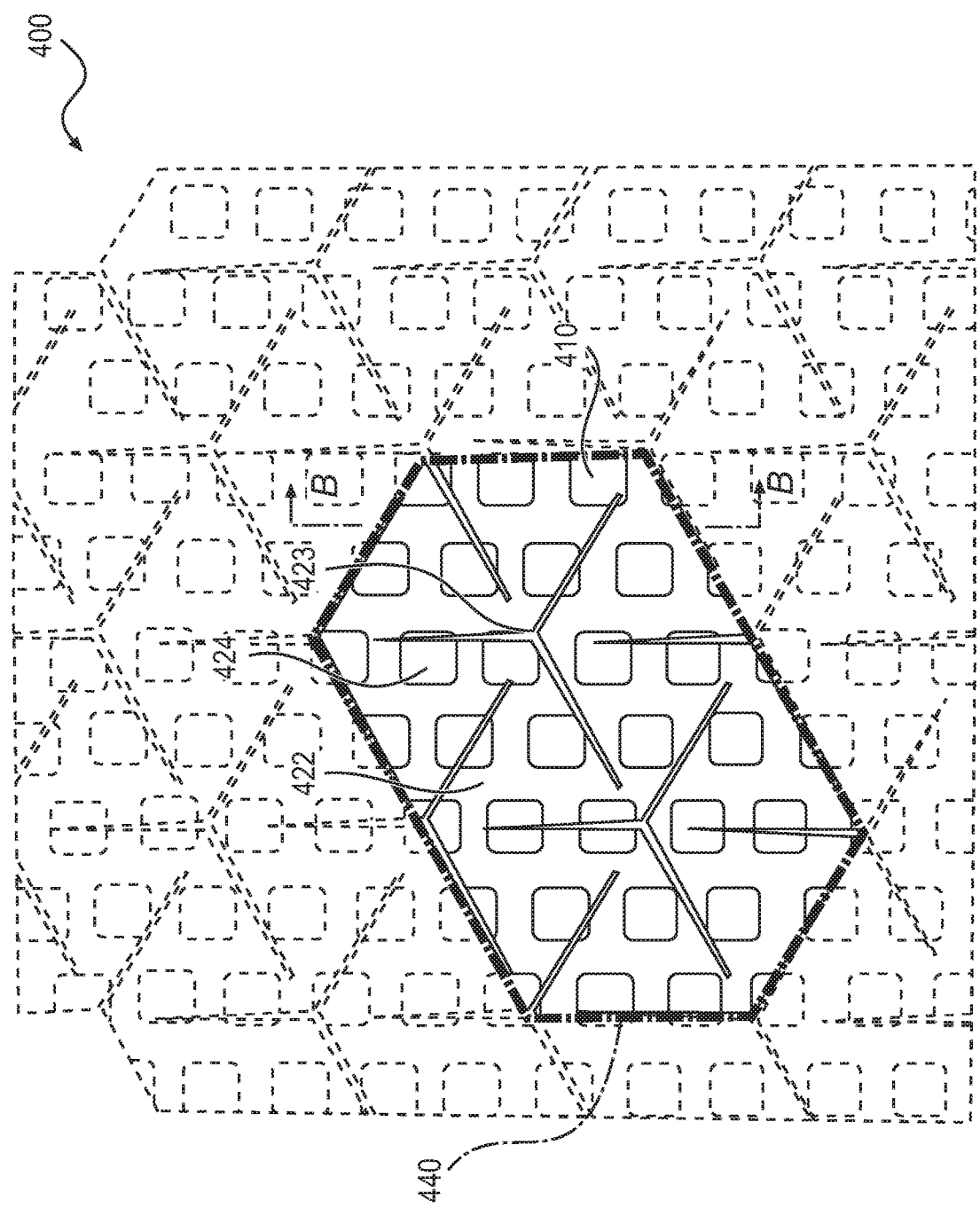
FIG. 19 is a schematic diagram of a bottom view of a portion of an outsole of an embodiment having ground-engaging members when it is not under tension.
Figure 20:
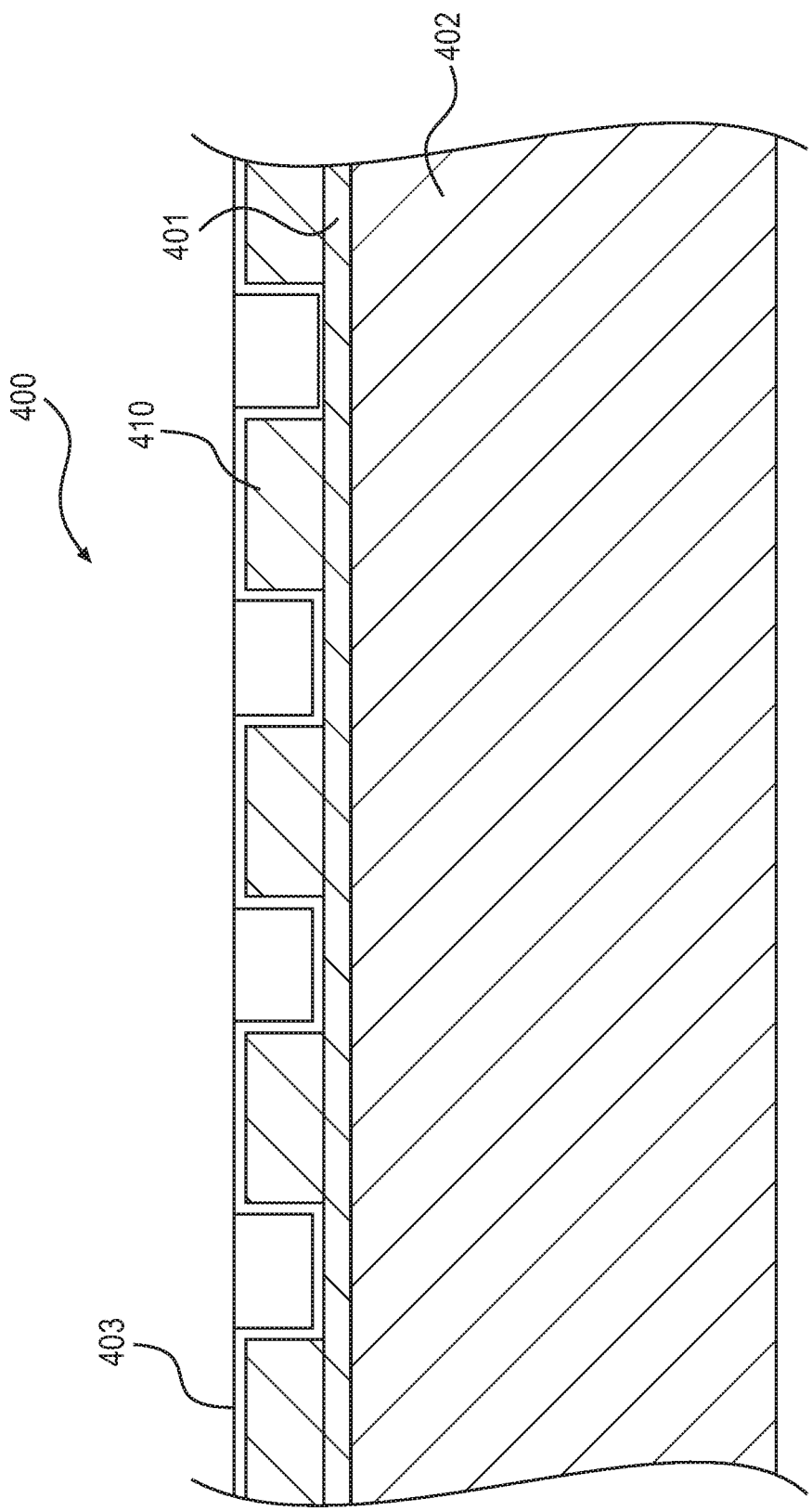
FIG. 20 is a schematic diagram of a cross-section of the sole of the embodiment shown in FIG. 19.
Figure 21:
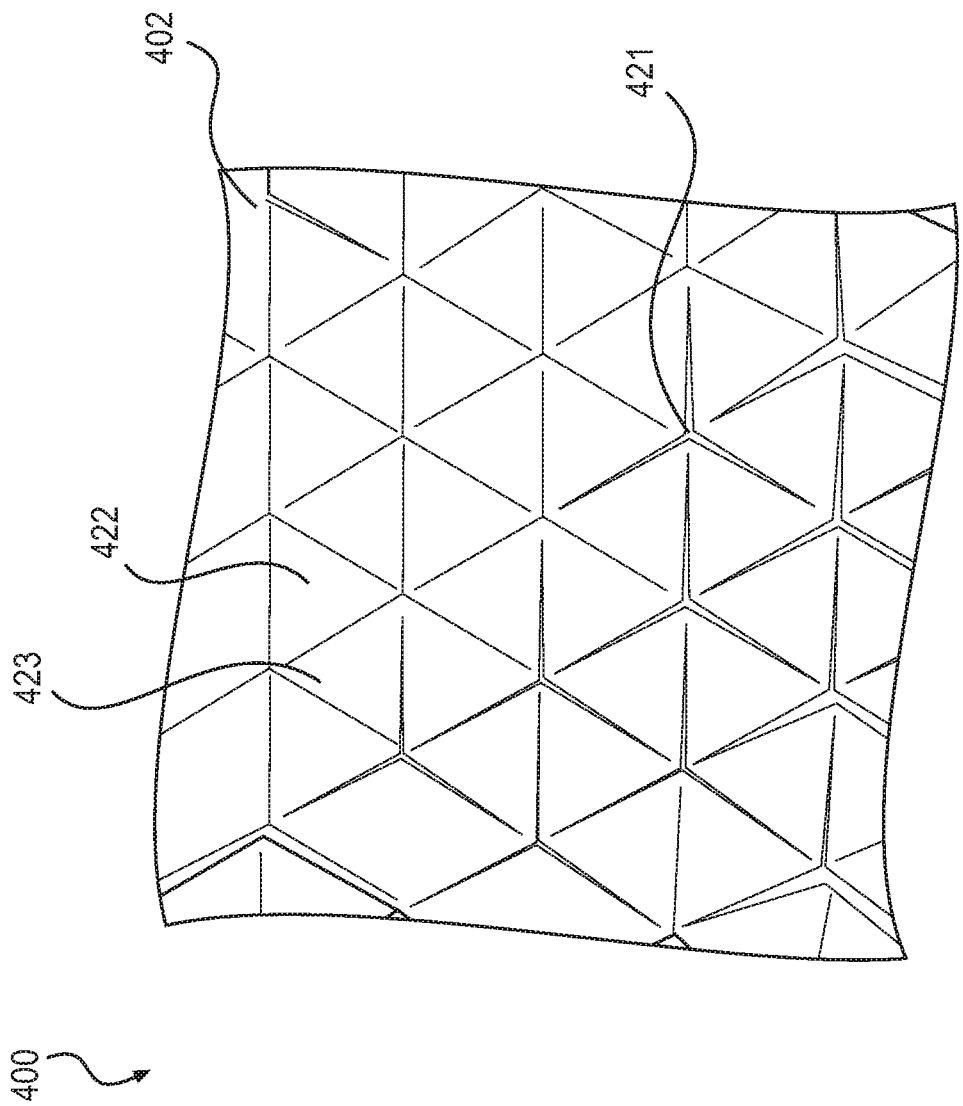
FIG. 21 is a schematic diagram of a top view of a portion of the outsole of FIG. 19 when it is not under tension.

FIG. 20 is a side cross-sectional view of sole 400, showing tread pattern 410 on outsole 401 and midsole 402. In some embodiments, as seen in FIG. 20, outsole 401 may also include an outer covering 403. The embodiment shown in FIGS. 19 to 25 has an outsole 401 made, for example, of a relatively hard material such as a hard rubber, and a midsole 402 made of a relatively resilient material such as EVA foam or polyurethane foam.

As shown in FIGS. 19, 21, 22 and 23, the outsole 401 and the midsole 402 both have the auxetic structure described above, i.e., they have a pattern of triangles joined at their vertices. The joints between the vertices 423 of triangles 422 are flexible, such that they function as hinges, allowing the triangles to rotate with respect to each other thus producing the apertures 421 shown in FIG. 22 and FIG. 23.

Figure 23:
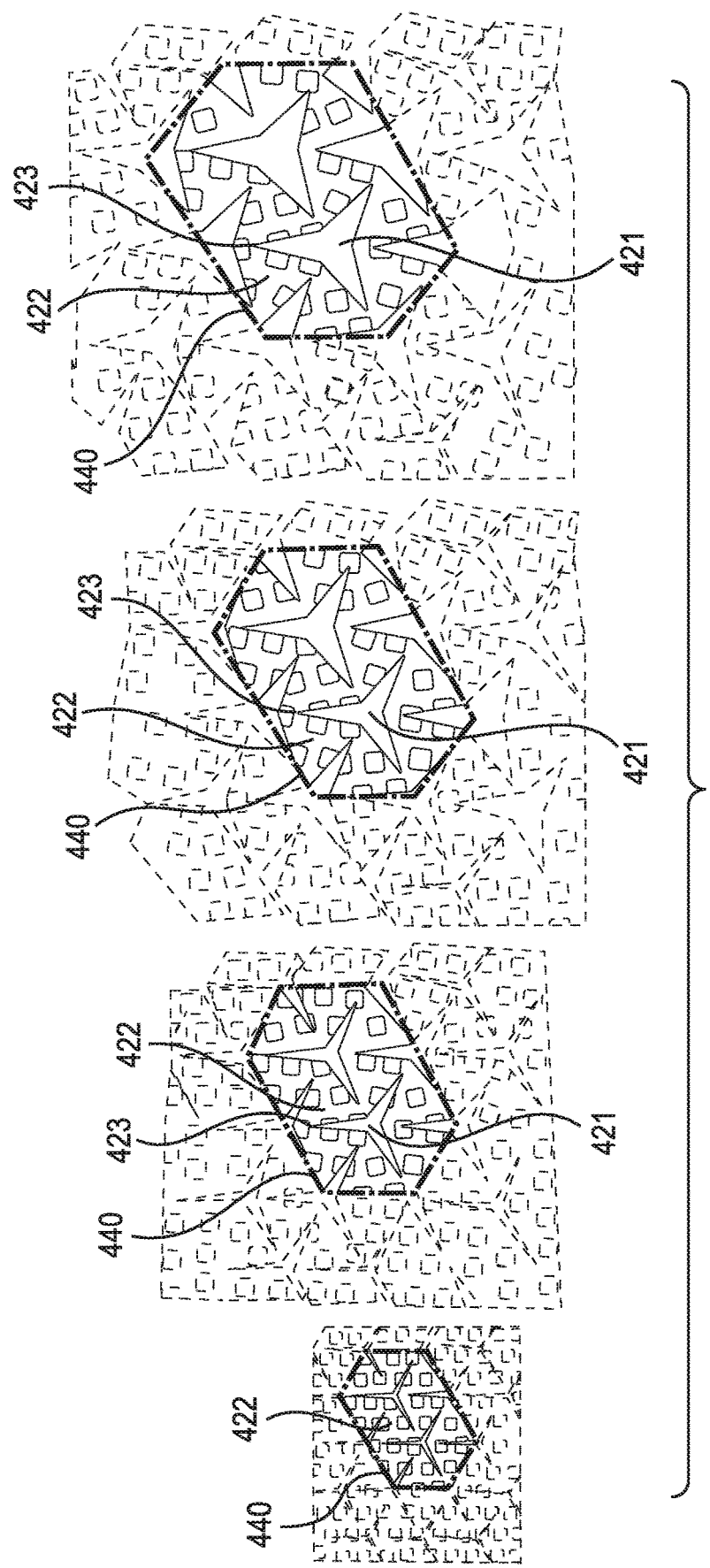
FIG. 23 shows a sequence of schematic diagrams of a bottom view of the portion of the outsole of FIG. 19 in various states of tension.

The portion of the sole outlined in dark dashed lines 440 in FIG. 19 is shown in the four schematic diagrams of FIG. 23. These diagrams show how the dimensions of the sole increase from their initial values when the sole is not under tension (the first diagram on the left) to when the sole is under low tension (second diagram), then when the sole is under moderate tension (third diagram) and finally when the sole is under greatest tension (fourth diagram).

Figure 24:
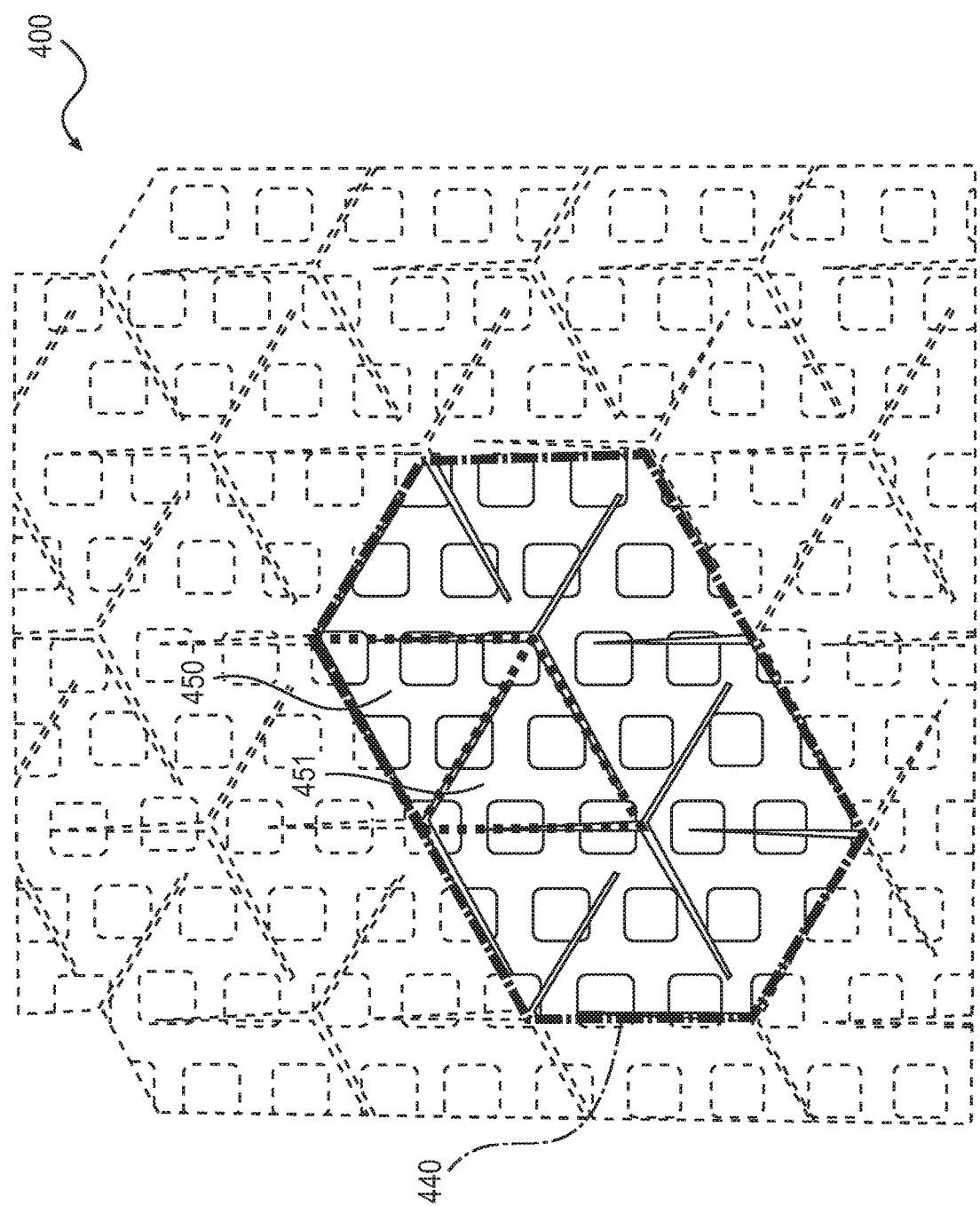
FIG. 24 is a schematic diagram of a bottom view of an outsole of an embodiment when it is not under tension.
Figure 25:
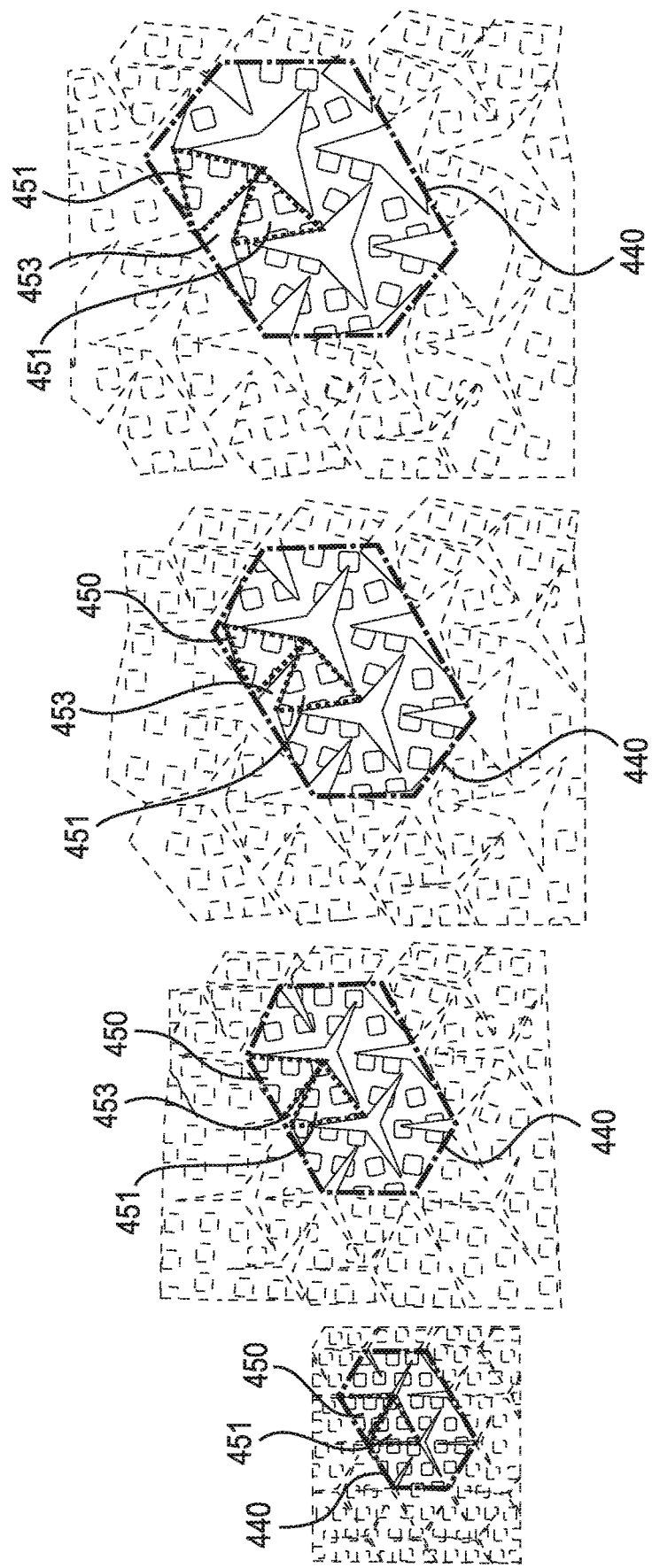
FIG. 25 shows a sequence of schematic diagrams of a bottom view of the portion of the outsole of FIG. 24 in various states of tension.

FIG. 24 is a bottom view of an outsole of an embodiment shown in FIG. 19 when it is not under tension. FIG. 24 identifies triangular feature 450 and triangular feature 451 within dark dashed lines 440. FIG. 25 is a sequence of four schematic diagrams showing how triangular feature 450 and triangular feature 451 rotate away from each other and open the aperture 453 between them as the outsole undergoes increasing tension.

In the embodiment shown schematically in FIGS. 19 to 25, the outsole has a tread pattern 410 that provides improved traction with the ground or the playing surface. The outsole optionally also has a thin, elastic and flexible "skin" or outer covering 403 that is molded to fit over the tread pattern. This outer covering may be made, for example, from an elastomeric material. The outer covering may be used to prevent water, dirt, particulates or other debris from entering the triangular openings created when the sole is under tension.

Figure 26:
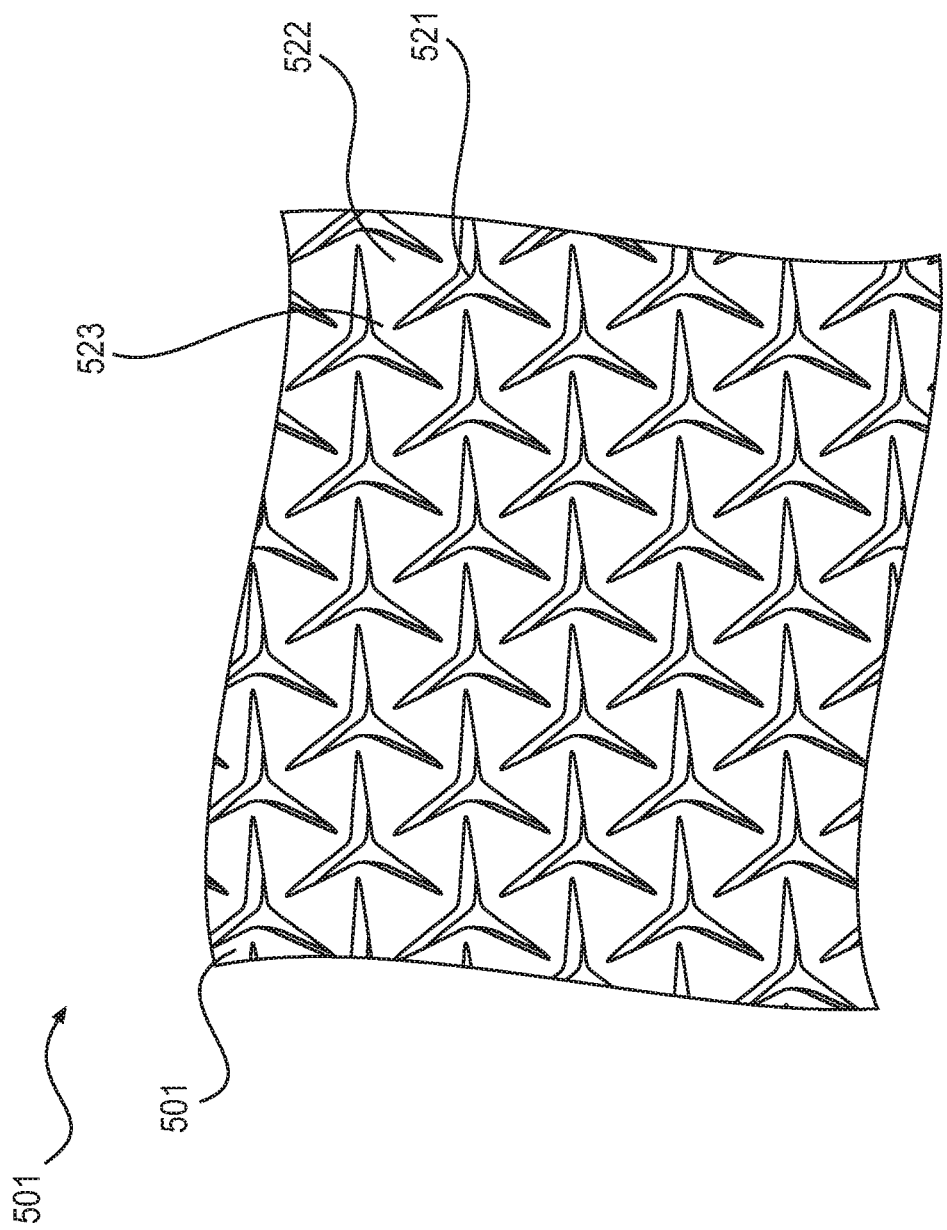
FIG. 26 is a schematic diagram of another embodiment of an outsole when it is not under tension.
Figure 27:
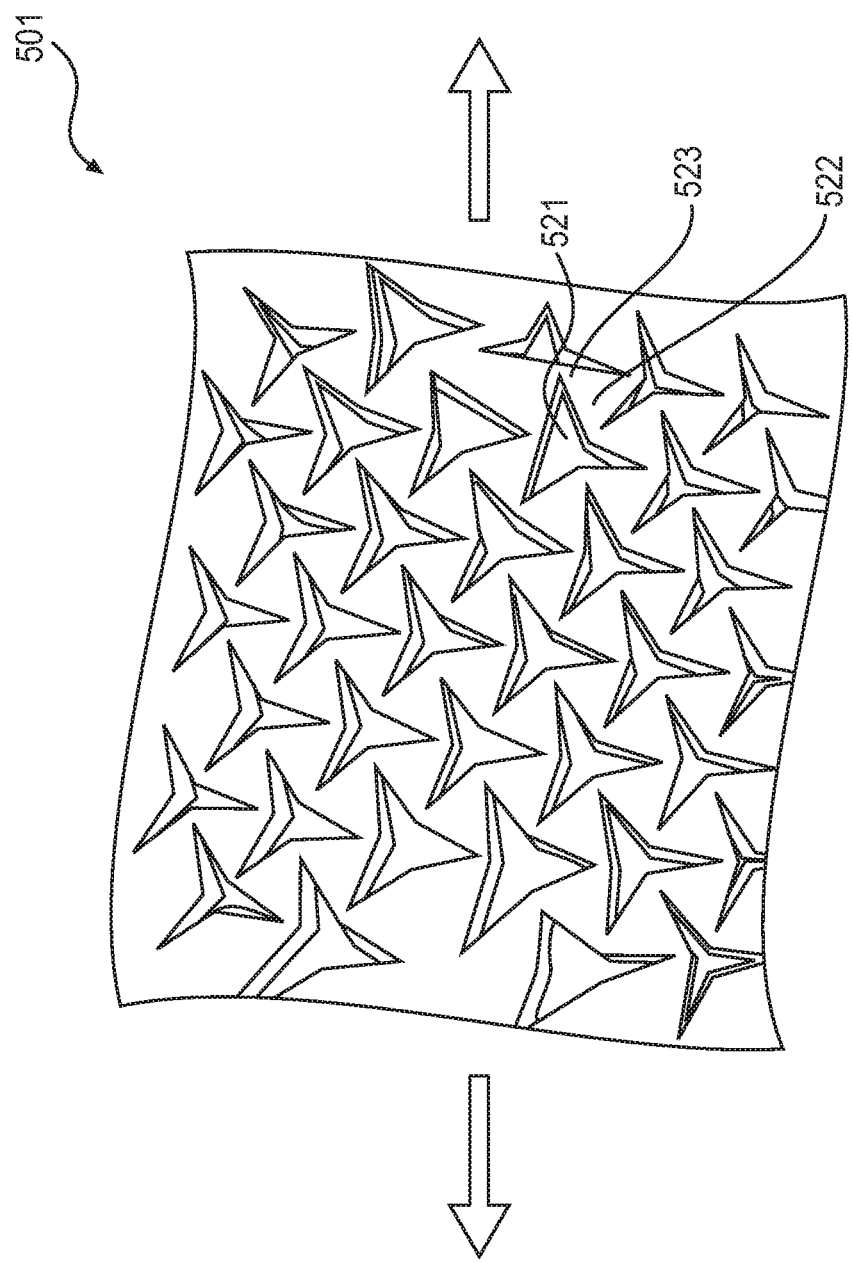
FIG. 27 is a schematic diagram of the embodiment of FIG. 26 when it is under tension.

The outer covering may be molded to fit into the star-shaped triangular apertures in the auxetic structure of the outsole. For example, FIGS. 26-31 are schematic diagrams of an embodiment in which an elastic and flexible outer covering is molded to mate into the triangular star-shaped openings of the auxetic structure. FIG. 26 shows the outsole structure 501 when it is not under tension. Outsole structure 501 has triangles 522 joined at their vertices 523 to adjoining triangles, which are separated by apertures 521. When the sole structure is under tension in one direction, it increases its dimension in that direction as well as in the direction orthogonal to that direction and in the plane of the structure, as shown in FIG. 27.

Figure 28:
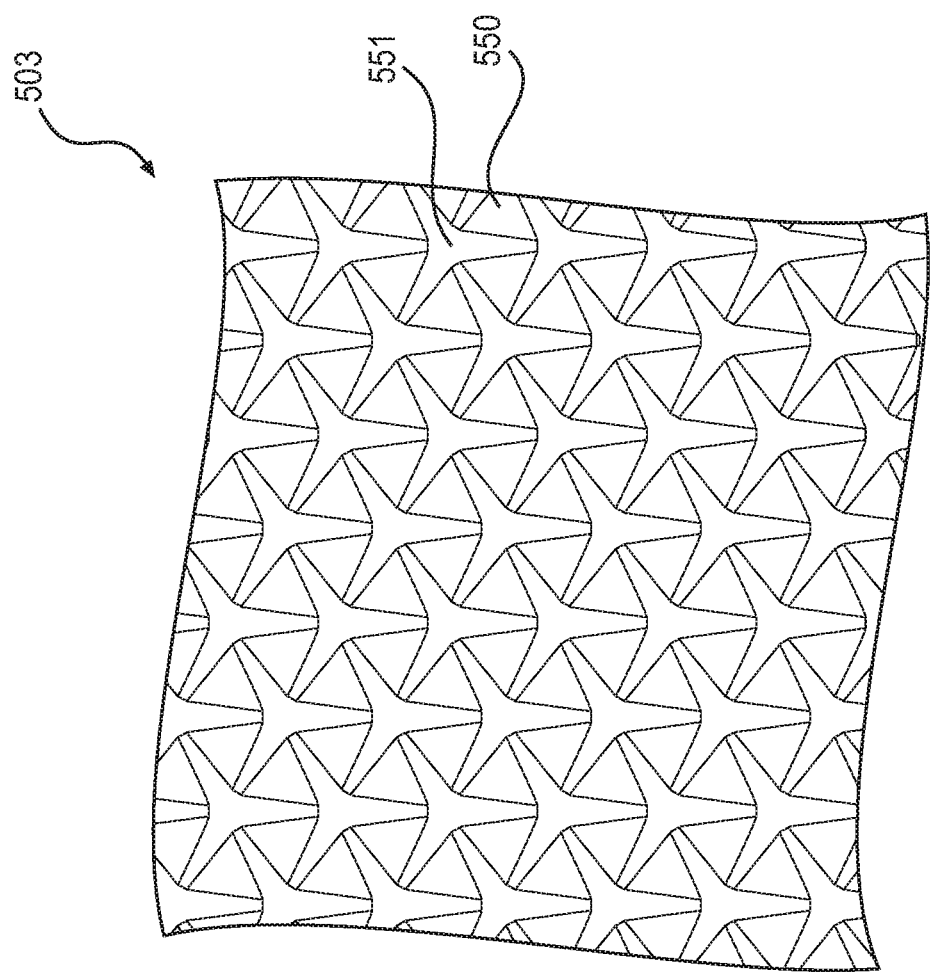
FIG. 28 is a schematic diagram of a top view of an embodiment of an outer covering that mates with the outsole of FIG. 26.
Figure 29:
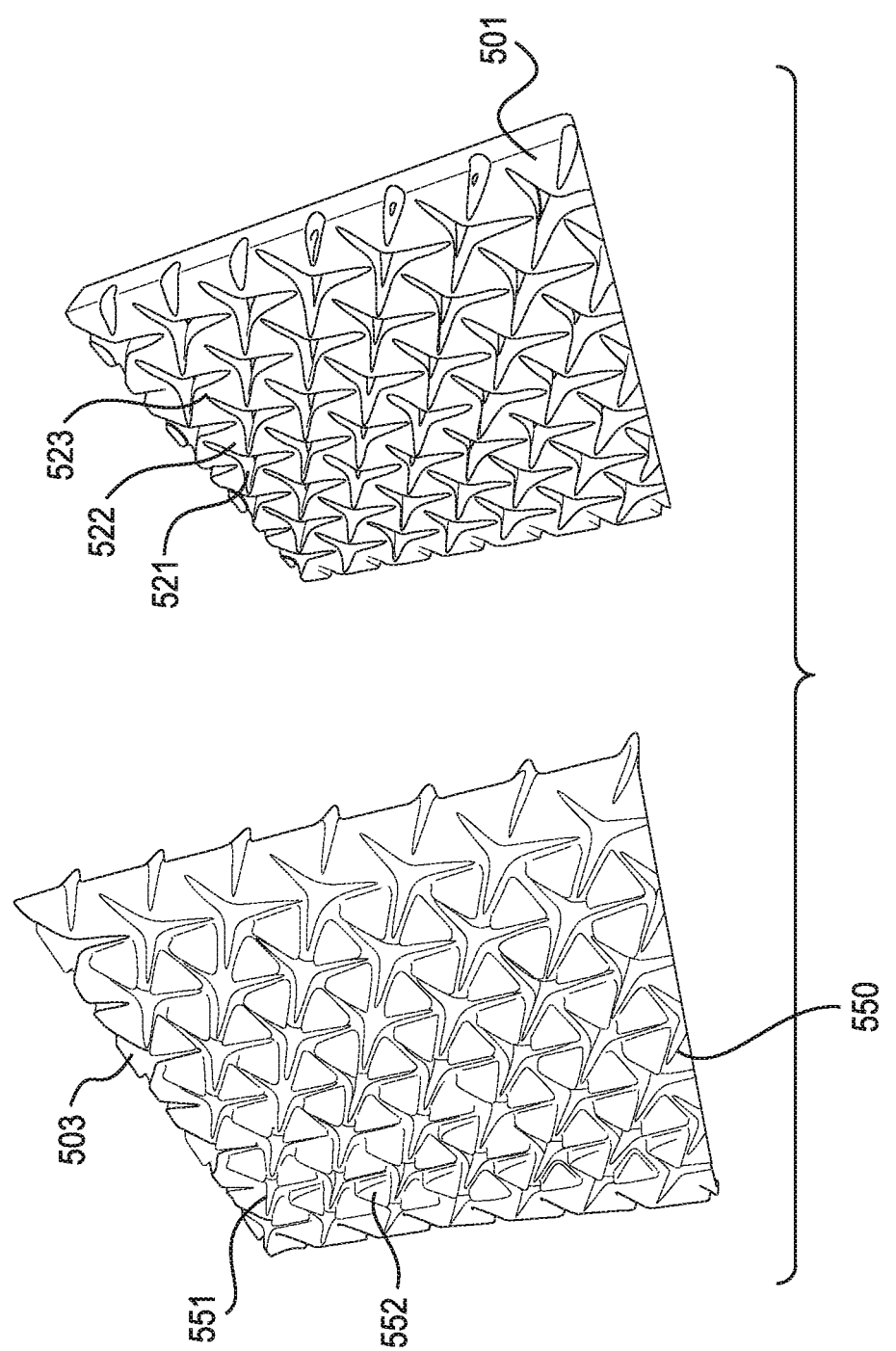
FIG. 29 is a schematic diagram showing how the outer the covering of FIG. 28 mates with the outsole of FIG. 26.

FIG. 28 is a schematic diagram of a top view of outer covering 503, i.e., it is a view from what would be the interior side of outer covering 503 when outer covering 503 is attached to the sole. This diagram shows features 551 that protrude from the surface 550 of outer covering 503. FIG. 29 is a schematic diagram showing how outer covering 503 mates with outsole 501. The features 551 on outer covering 503 are now shown from the opposite side of outer covering 503, such that they appear as recesses instead of protuberances. The outer covering (which would be on the bottom of an article of footwear and therefore bears the ground-contacting surface) exhibits a triangular tread pattern 552. Because outer covering 503 is fabricated from a stretchable elastic material, it stretches readily to accommodate the increased length and width of whatever portions of outsole 501 may be under tension. Thus the pattern of features 551 serves the dual function of mating to the auxetic material of outsole 501 and providing triangular tread pattern 552 which serves to improve the wearer's traction against the playing surface.

Figure 30:
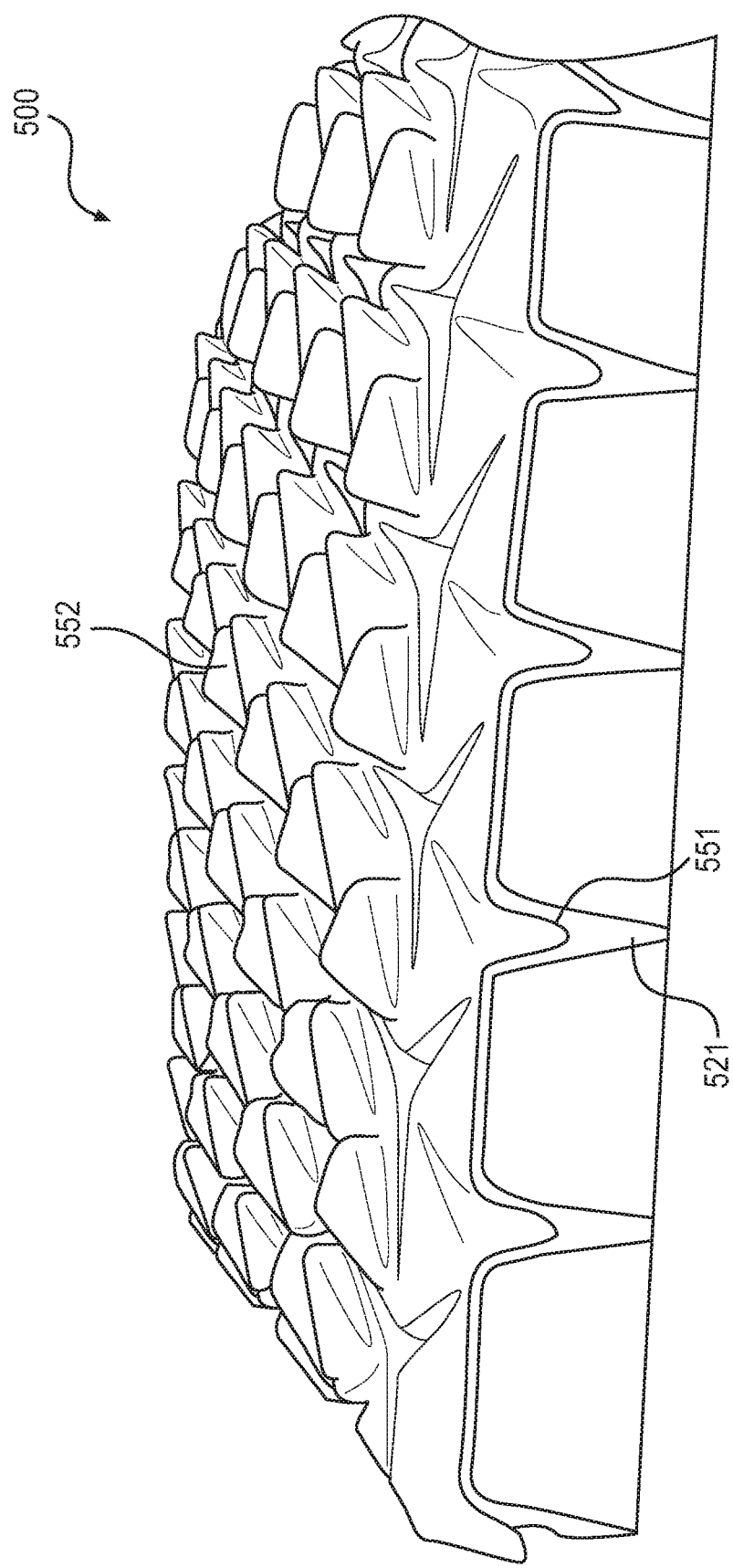
FIG. 30 is a schematic diagram of a side perspective view of the outsole and outer covering of FIG. 28 and FIG. 29.
Figure 31:
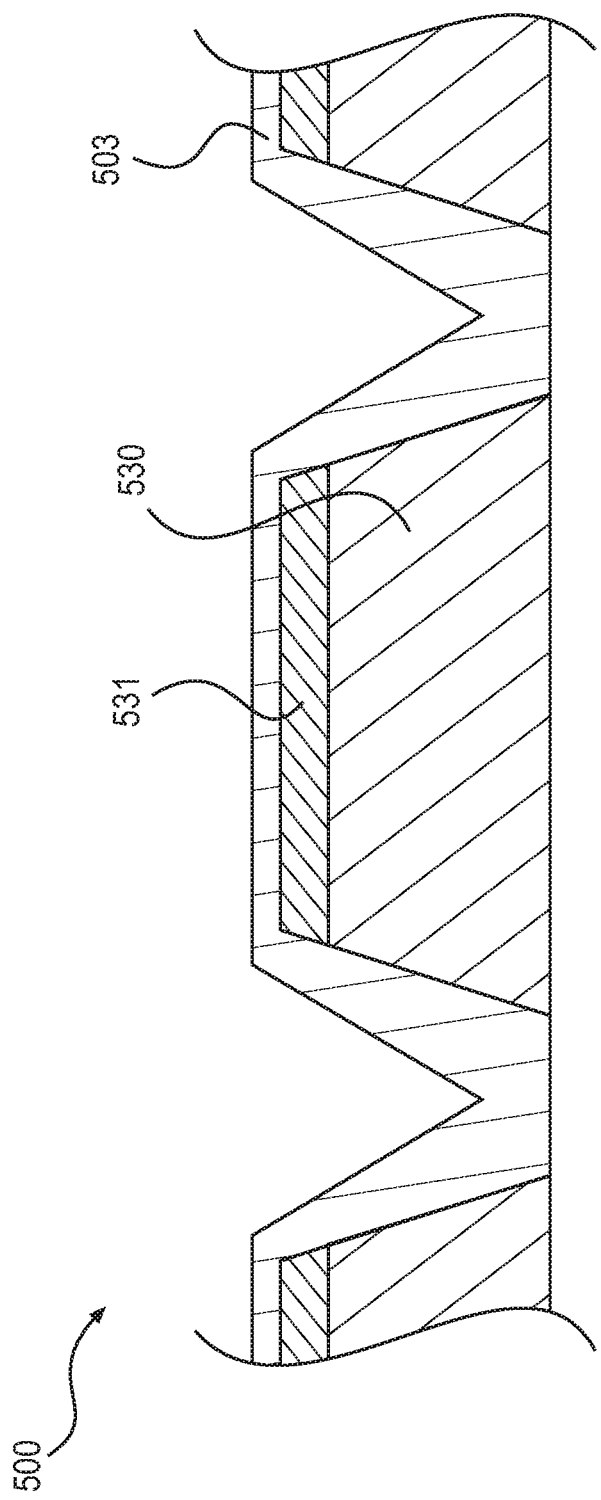
FIG. 31 is a schematic diagram of is a cross-section of an exemplary construction of a sole bearing the outsole of FIG. 26 and the outer covering of FIG. 28.

FIG. 30 is a side perspective view of a section of sole structure 500 and outer covering 503, showing how the vertices in outer covering 503 fit into apertures 521. Because outer covering 503 is made from a thin, flexible and elastic material, it can readily stretch to accommodate the expansion of outsole structure 501 when it is under longitudinal or lateral tension. FIG. 31 is a cross-section of a portion of an exemplary construction of sole structure 500, showing a midsole layer 530 and an outsole layer 531, as well as outer covering 503.

Figure 32:
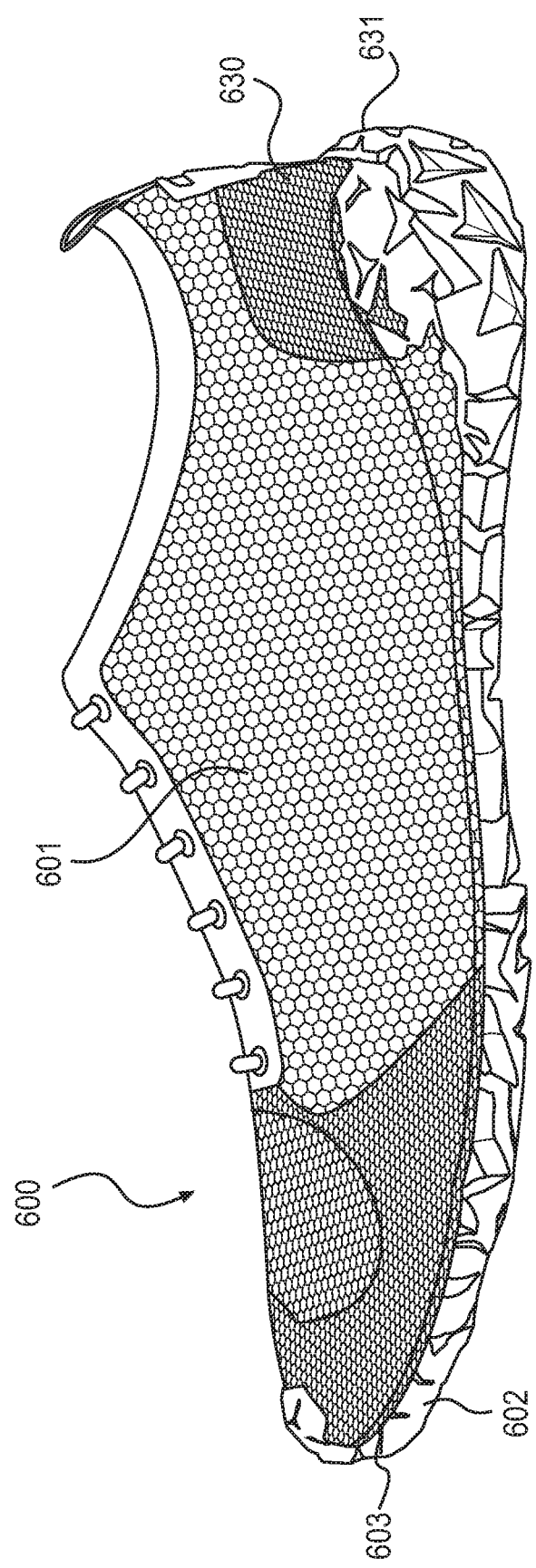
FIG. 32 is a schematic diagram of an embodiment of an article of footwear with a knit upper and a sole having an auxetic structure.
Figure 33:
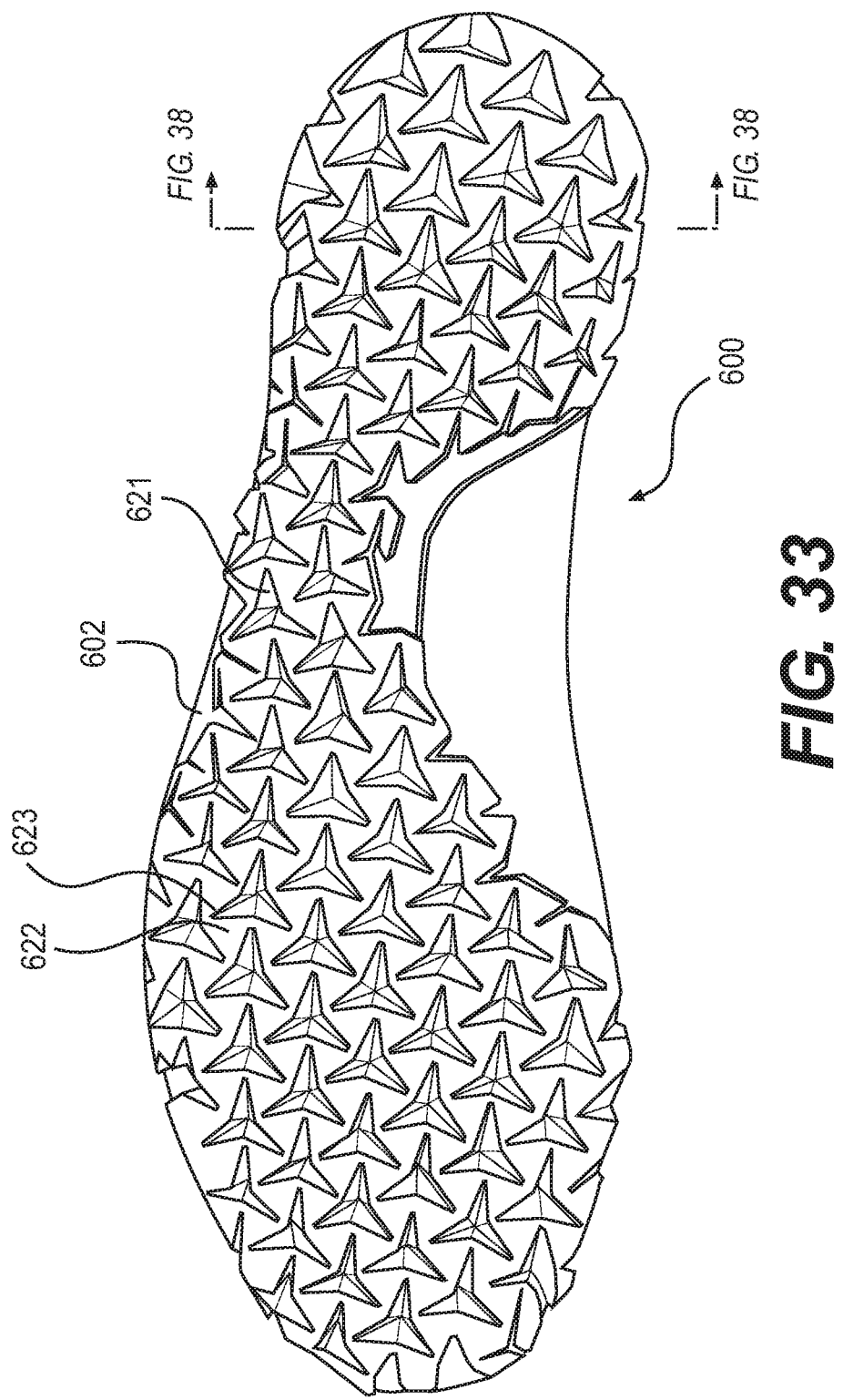
FIG. 33 is a schematic diagram of the outsole of the article of footwear of FIG. 32 showing its auxetic structure.
Figure 34:
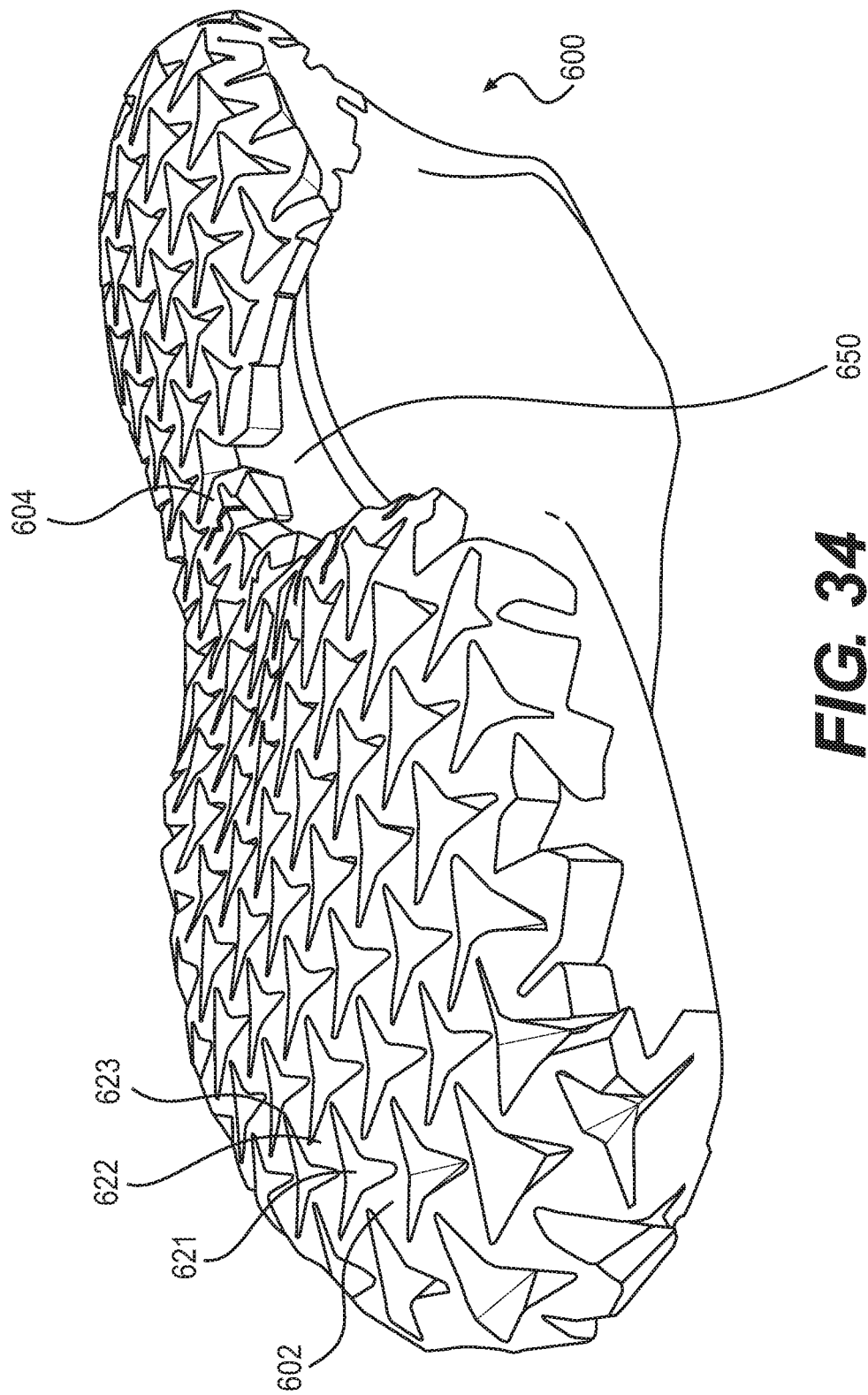
FIG. 34 is a schematic diagram of a side perspective view of the article of footwear of FIG. 32.

FIGS. 32-38 illustrate another embodiment of an article of footwear 600 with a sole having an auxetic structure that is light, flexible and comfortable. This article of footwear is suitable for use as a shoe for light jogging or walking. As shown in FIG. 32, this embodiment has an open knit upper 601, an outsole 602 made of an auxetic structure, and an insole 603. FIG. 32 shows that the polymer material forming outsole 602 curves up around the back 631 of the heel 630 of the footwear, providing additional reinforcement, support and protection at the back of the heel. As shown in FIG. 33 and FIG. 34, outsole 602 has a pattern of reentrant triangular apertures 621 formed by the triangles 622 that are joined at their vertices 623 to the vertices of other triangles. In this embodiment, the size of reentrant triangular apertures 621 is relatively uniform all over outsole 602. When a portion of footwear 600 is under longitudinal or lateral tension due to an impact with the ground, that portion of outsole expands in both directions, thus absorbing the impact and improving traction as described above. Outsole 602 may be made by molding the auxetic structure shown in FIGS. 33-35 into a synthetic rubber, polyurethane or thermoplastic polyurethane material.

Figure 35:
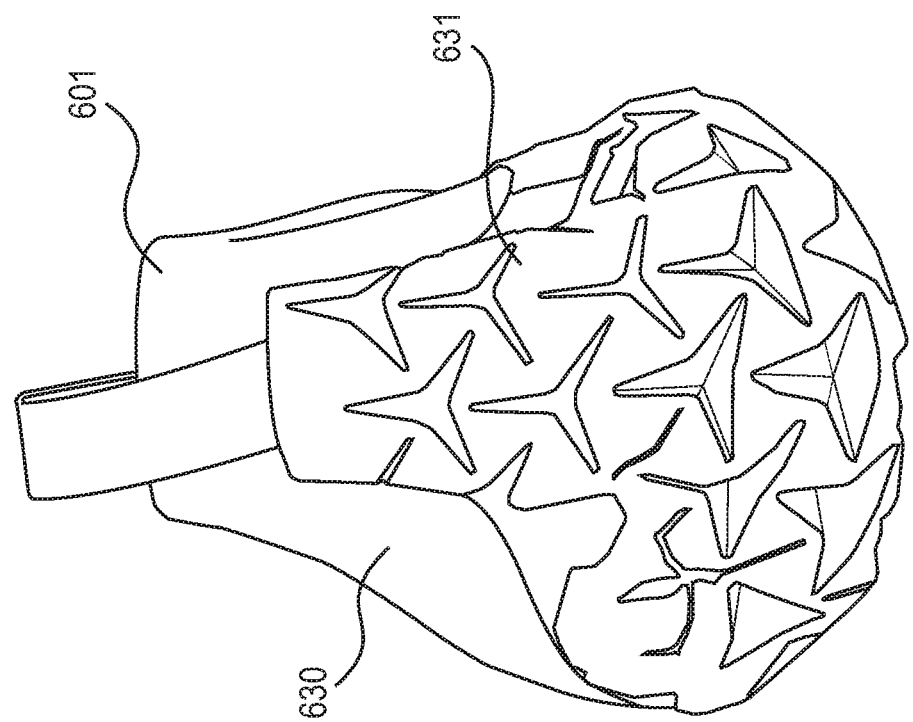
FIG. 35 is a schematic diagram of an enlarged perspective bottom view of the heel of the article of footwear of FIG. 32.

FIG. 35 is a schematic diagram of an enlarged view of the back 631 of heel 630 of article of footwear 600. As shown in FIG. 35, the back 631 of the heel 630 of upper 601 may be overlaid with the auxetic structure used for outsole 602 to strengthen the back of the heel. This may be fabricated by overmolding the fabric of upper 601 with a polymer such that the polymer infiltrates and bonds with the material of upper 601. As shown in FIG. 35, the auxetic structure has reentrant angles at the bottom side of the apertures, such that the auxetic structure expands laterally when it is under longitudinal tension. This effect facilitates pulling the shoe over the heel of the wearer's foot.

Figure 36:
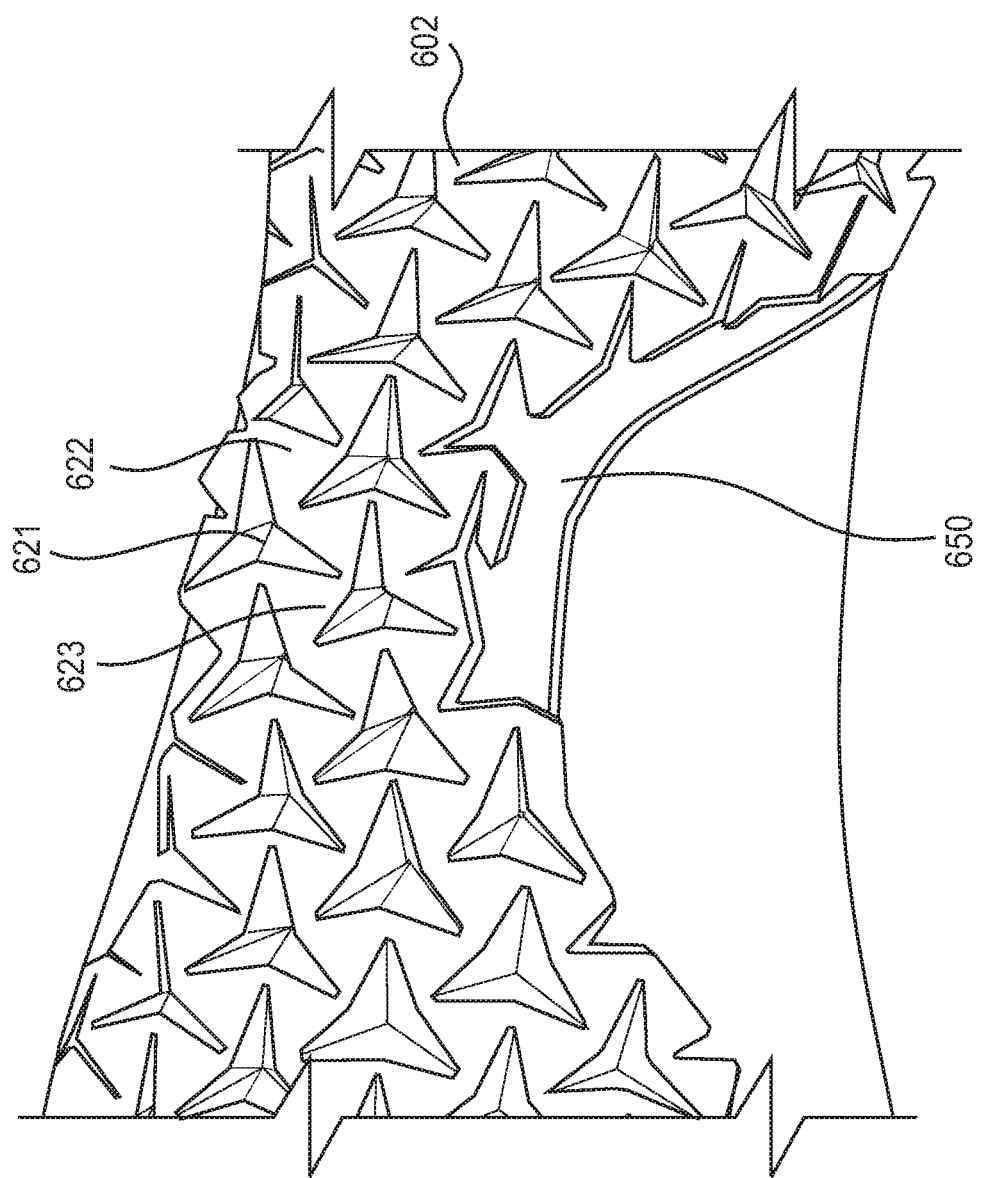
FIG. 36 is a schematic diagram of an enlarged view of a midfoot portion of the outsole of the article of footwear of FIG. 32.

As best shown in FIG. 36 and also shown in FIG. 34, the flexibility of footwear 600 is enhanced by carve-out 650 at the instep region 604 of outsole 602. Carve-out 650 limits outsole 602 to just the lateral side of the footwear at instep region 604, thus providing less resistance to the upward bending of the heel with respect to the forefoot. This structure provides a comfortable, low-stress article of footwear that is particularly suitable for activities such as jogging or walking.

Figure 37:
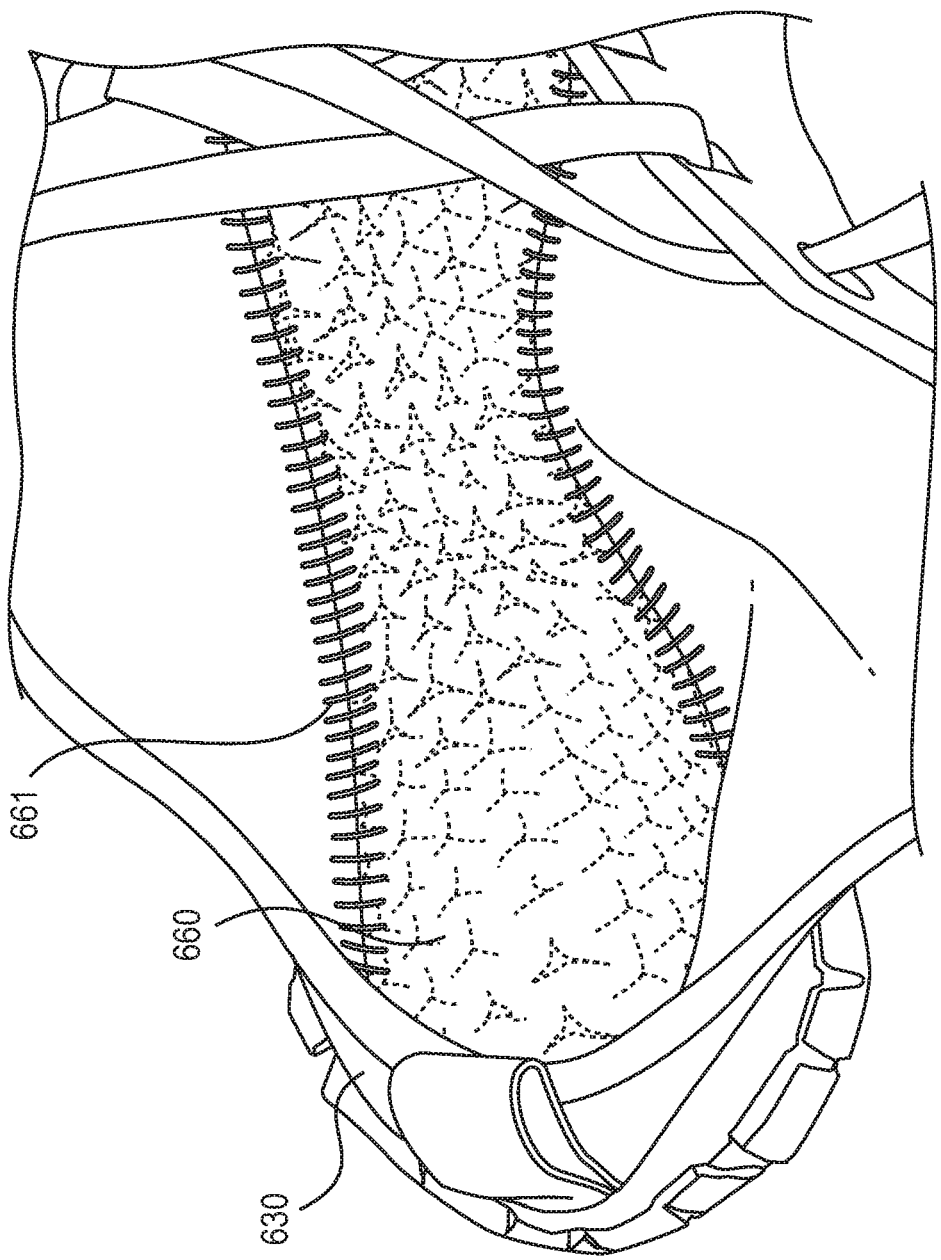
FIG. 37 is a schematic diagram of the interior of the article of footwear of FIG. 32.
Figure 38:
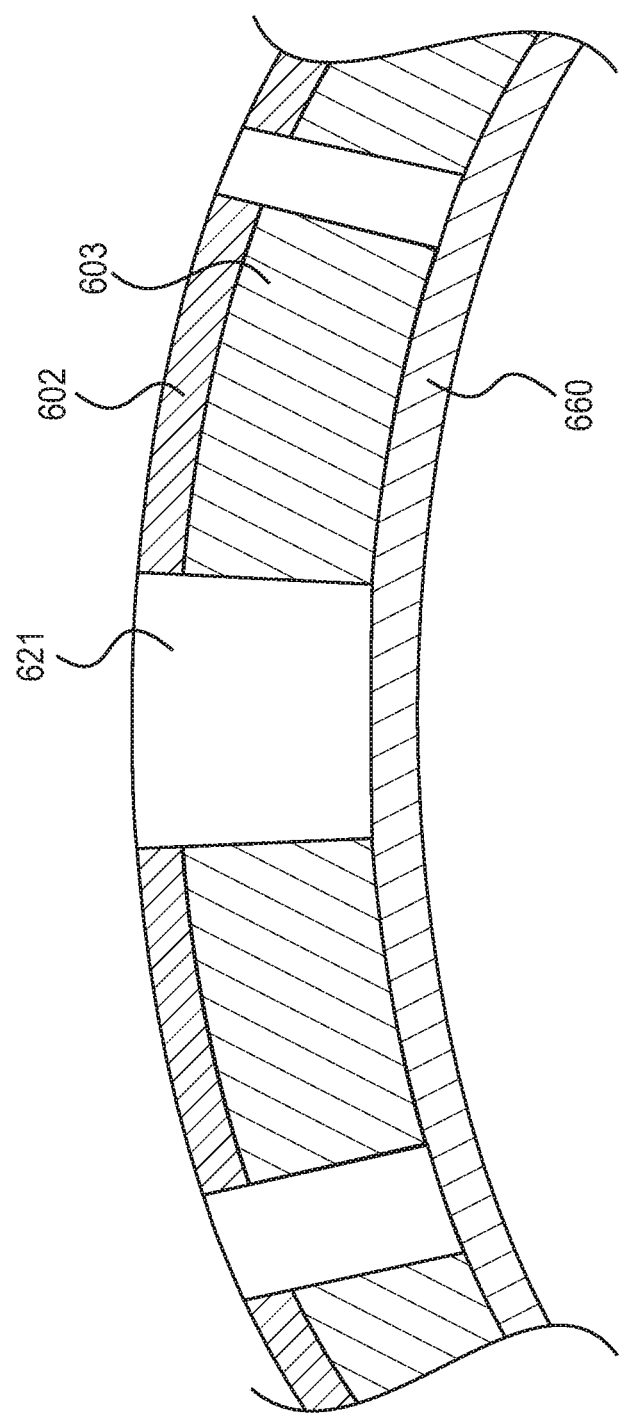
FIG. 38 is a schematic diagram of a cross-section of the article of footwear of FIG. 32 taken at the forefoot.

FIG. 37 is a schematic diagram showing that, in this embodiment, upper 601 is sown to an insole 660 by stitching 661. Outsole 602 can then be attached to the bottom of insole 660 by using adhesives, for example, or by other means, such as by fusing, molding or stitching. FIG. 38 is a cross-section across a portion of the forefoot of article of footwear 600 at as indicate in FIG. 33, showing insole 660, openings 621 and outsole 602 as well as midsole 603, which is optional.

FIGS. 39-43 are schematic diagrams of an article of footwear 700 that could be used, for example, as a running shoe for running on hard surfaces such as a paved road or an indoor track, where the runner would be pounding the footwear against the ground. This embodiment has a woven fabric upper 701 and a molded hard rubber or polyurethane outsole 702.

Figure 40:
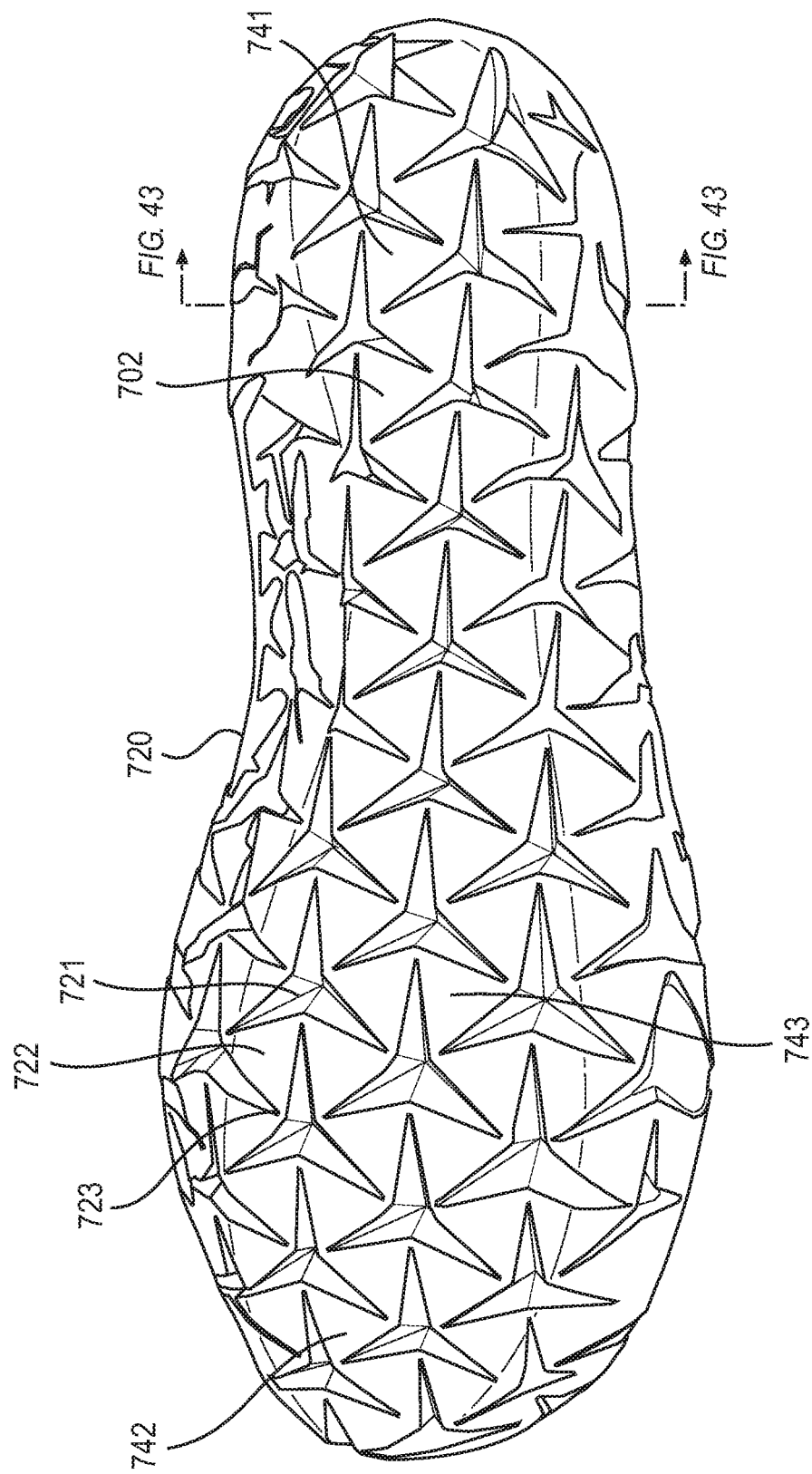
FIG. 40 is a schematic diagram of a bottom view of the outsole of the article of footwear of FIG. 39.

As shown in FIG. 40, outsole 702 bears a pattern of hexagonal patterns 720 with reentrant triangular apertures 721 formed by triangles 722 that are joined at their vertices 723 such that they function as hinges, allowing triangles 722 to rotate with respect to each other in response to longitudinal or lateral tension. When any part of the outsole hits the ground or a playing surface, the vertical compression of the outsole forces the triangles towards the center of the hexagonal patterns, i.e., the triangular star-shaped apertures collapse towards their centers. This increases the density of the outsole in the area of impact, and attenuates the impact force. The pattern in outsole 702 may be formed by molding the outsole material to form the pattern, or by cutting triangular star-shaped sections out of a solid material.

Figure 41:
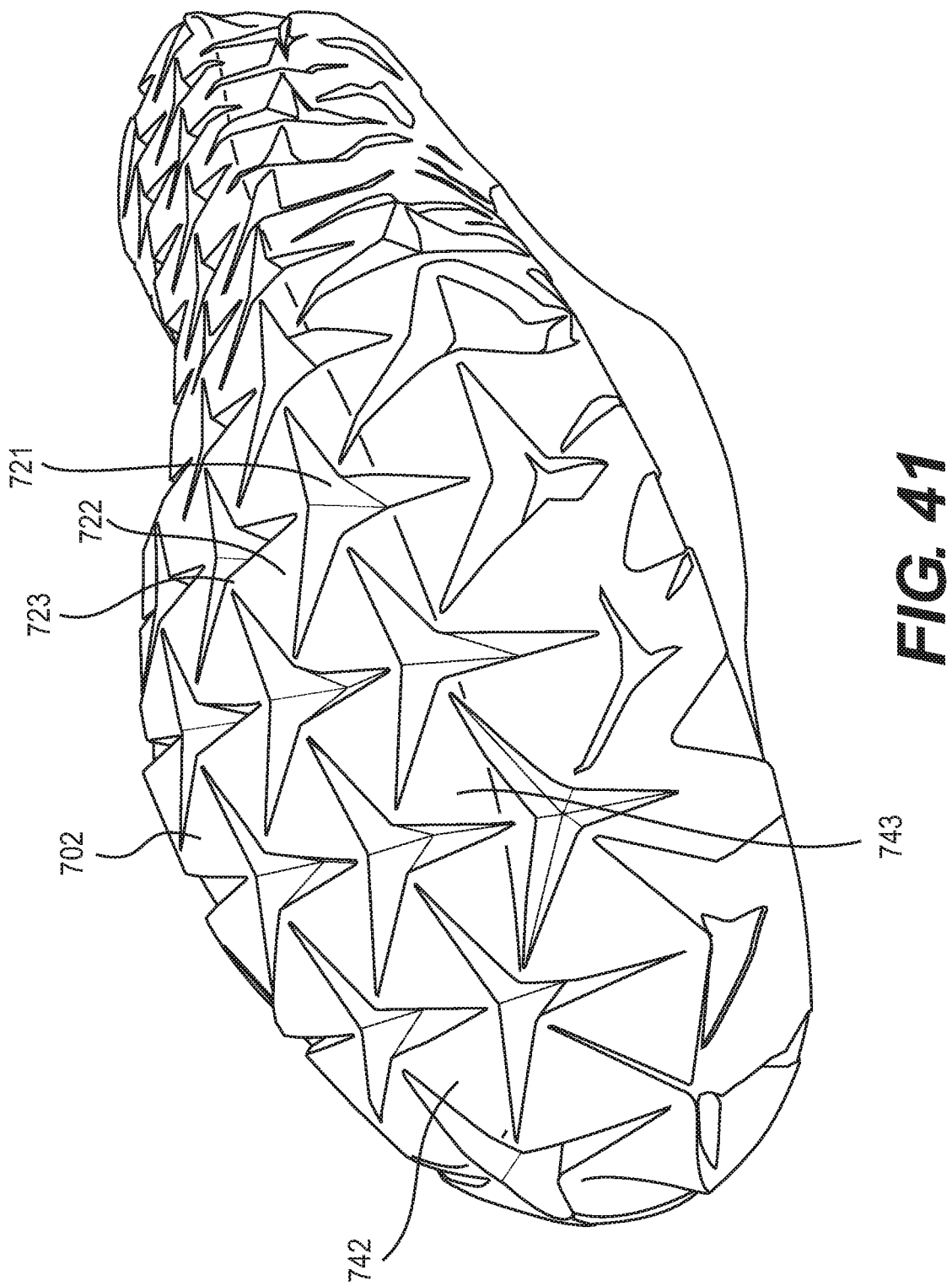
FIG. 41 is a schematic diagram of an enlarged perspective bottom view of the forefoot region of the article of footwear of FIG. 39.

In this embodiment, the hexagonal patterns have roughly the same size from the heel to the toe of the foot, with one hexagonal feature 741 directly under the wearer's heel and several hexagonal patterns 743 under the ball of the wearer's foot, as shown in FIG. 40. As best shown in FIG. 41, outsole 702 also has one hexagonal feature 742 directly under the wearer's big toe. Hexagonal patterns 720 towards the medial, lateral, front or rear portions of sole 702 curve upwards from the outsole and are attached to the fabric of upper 701 by overmolding or by using adhesives.

Figure 39:
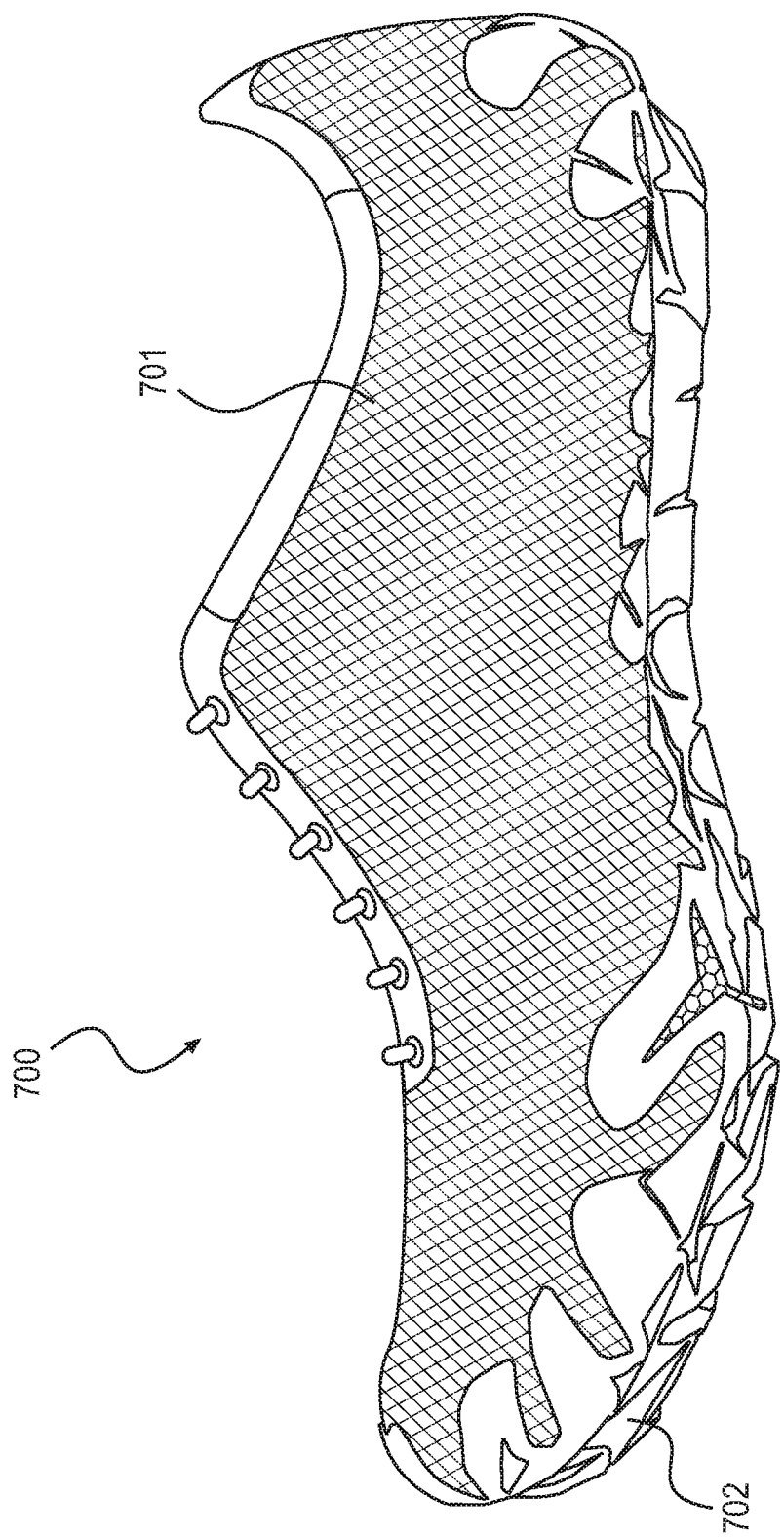
FIG. 39 is a schematic diagram of a side view of a running shoe with a woven upper including an auxetic sole structure.
Figure 42:
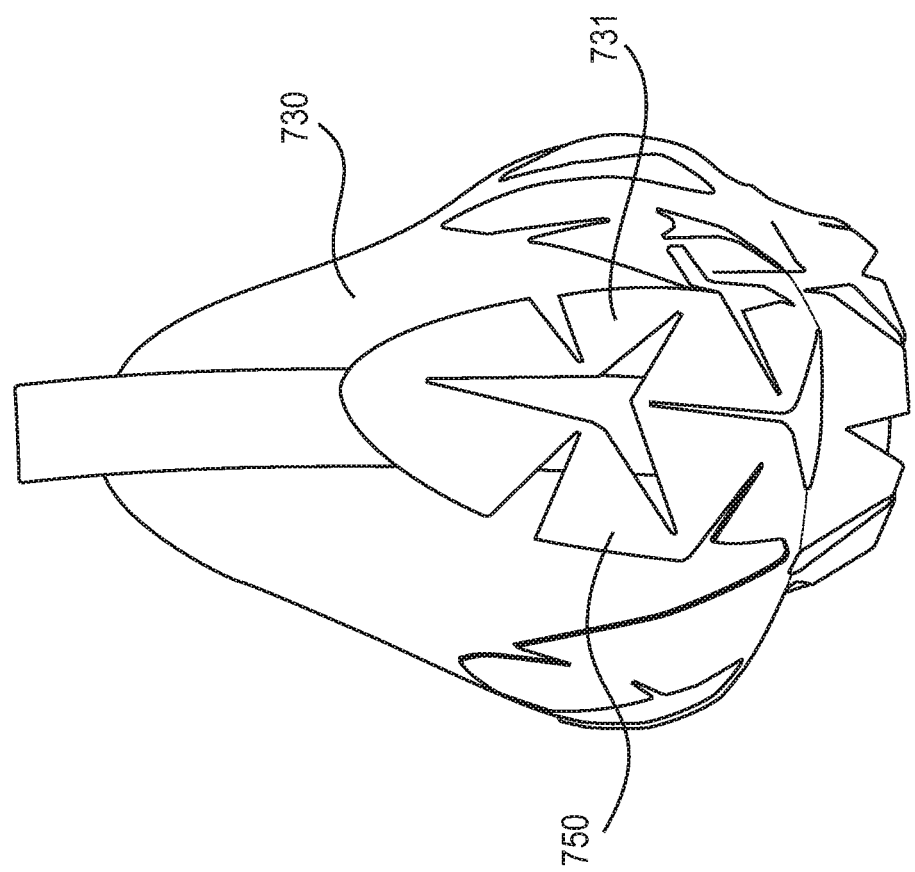
FIG. 42 is a schematic diagram of an enlarged perspective view of the heel of the article of footwear of FIG. 39.

As shown in FIG. 42, the back 731 of the heel 730 of the upper 701 is reinforced with an overmolded or otherwise attached portion of hard rubber or polyurethane 750 bearing the hexagonal feature of a reentrant triangular aperture formed by triangles joined at their vertices. When the footwear is pulled over the heel of the wearer's foot, the reentrant triangular aperture expands laterally, allowing the footwear to slip more easily over the wear's heel. FIG. 39 and FIG. 42 show that portions of the sole material may be molded over the fabric of upper 701, providing reinforcement and abrasion resistance to its lower edges.

Figure 43:
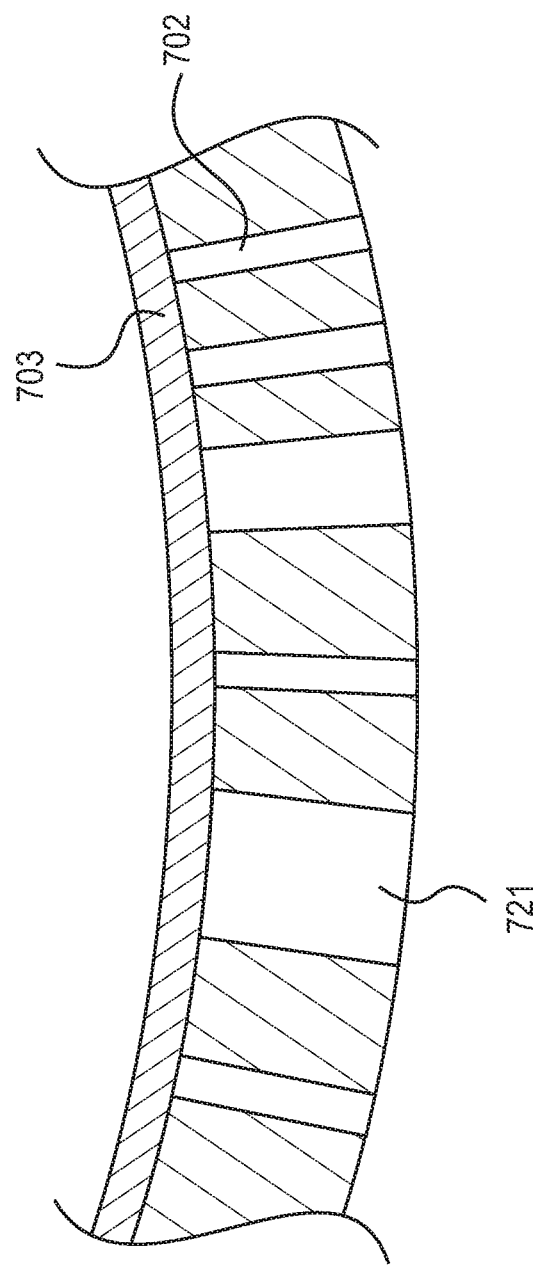
FIG. 43 is a schematic diagram of a cross-section of the article of footwear of FIG. 39.

FIG. 43 is a schematic diagram cross-section of the embodiment of FIG. 40 taken at the forefoot, just in front of the laces as shown in FIG. 40. This diagram shows outer sole 702 with apertures 721 attached to a resilient inner sole 703. Outer sole 702 may be attached to inner sole 703 by using adhesives, overmolding or any other suitable means.

Figure 44:
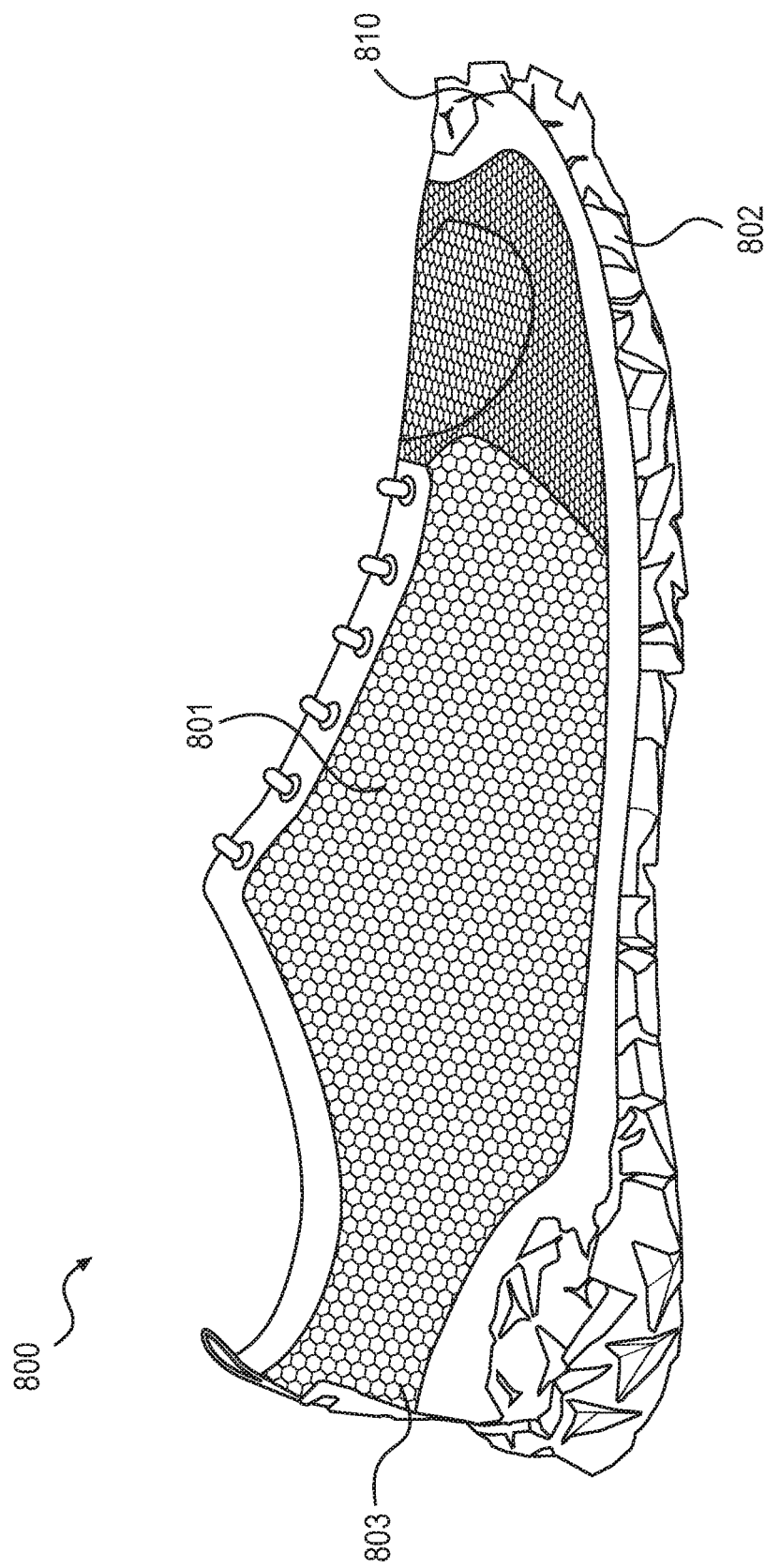
FIG. 44 is a schematic diagram of a side view of another embodiment of a shoe with an upper and a outsole having an auxetic structure.
Figure 45:
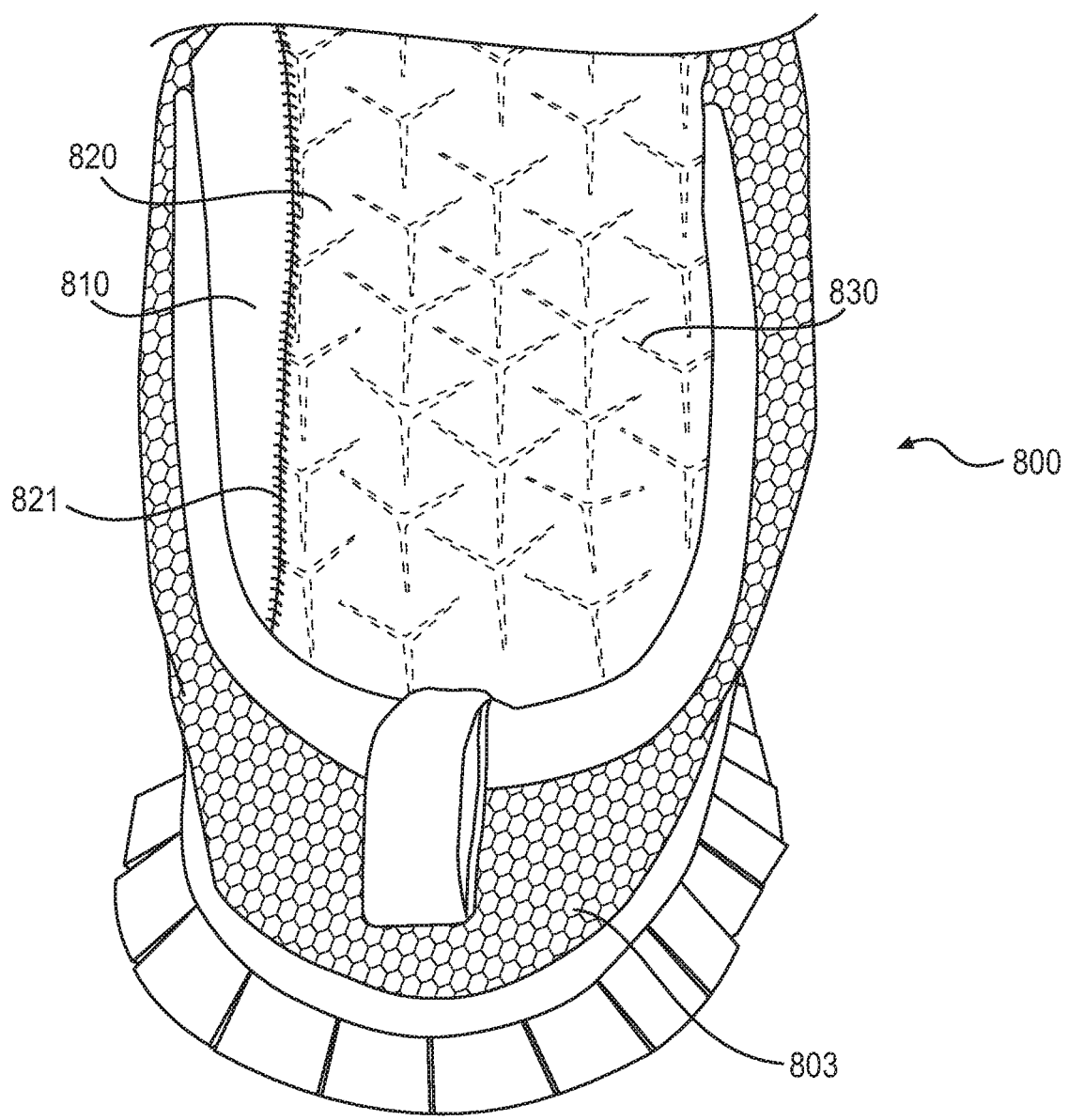
FIG. 45 is a schematic diagram of the interior of the article of footwear of FIG. 44 at the heel region of the shoe.

FIG. 44 is a schematic diagram of another embodiment of a shoe 800 that could be used for running or other sports or recreational activities. This shoe is generally similar to the shoe shown in FIG. 32, but it has an additional peripheral band of material 810 connecting sole 802 to upper 801. Peripheral band 810 extends around the entire periphery of sole 802 and upper 801. FIG. 45 is a schematic diagram of an interior view of shoe 800 at its heel region 803, showing insole 820 attached to the bottom edge of peripheral band 810 using stitching 821. The top edge of peripheral band 810 is attached to the bottom edge of upper 801. Other methods of attaching peripheral bands 810 to the insole and to the upper may also be used. Peripheral band 810 provides additional flexibility to footwear 800 by decoupling sole 802 from upper 801, thus allowing sole 802 to expand without being constrained by upper 801. The pattern of apertures 830 in the midsole can be seen under insole 820.

The auxetic structures used for the outsoles and midsoles shown in these figures can be manufactured by molding a conventional polymer (such as EVA, rubber, polyurethane or thermoplastic polyurethane) to have the pattern of joined triangles or polygons with triangular or polygonal apertures as described herein. The structures could also be manufactured by casting a solid polymer sheet and cutting the desired patterns into the sheet. For example, the auxetic structure shown in FIGS. 4-15 may be produced by molding a polymer to have the desired pattern, whereas the auxetic structure shown in FIGS. 16-19 may be produced by cutting the patterns into a polymer sheet.

In some of the sole structures described above the whole extent of the sole is made of an auxetic structure. However, that is not a requirement for all embodiments. For example, embodiments may use the auxetic structure described above in any one, two or three of the heel region, the midfoot region and the forefoot region of the sole, or throughout the sole. The sole may have a single outsole layer. It may alternatively have an outsole and an inner sole, or an outsole, a midsole and an inner sole, or an outer covering, an outsole, a midsole and an inner sole, or any combination of the above. It may have even more layers, as long as the sole exhibits an auxetic structure such that, when under tension in one direction, it expands in the direction orthogonal to the direction of the tension.

The descriptions above have described auxetic structures using hexagonal patterns formed of hinged triangles that have openings that increase in both length and width when under longitudinal tension and also increase in both width and length when under lateral tension. These structures could also be formed using auxetic foam material, which is a material with a negative Poisson's ratio, such that the resulting structure expands in the direction orthogonal to an applied tension both because of its intrinsic properties and because the material itself is intrinsically auxetic.

The present embodiments depict auxetic structures that have a substantial thickness in comparison to some other kinds of auxetic materials. Generally, the thickness of an auxetic structure, such as an outsole comprising an auxetic structure, can vary. In some embodiments, an auxetic structure forming part of a sole structure may have a thickness greater than or equal to a millimeter. In some embodiments, an auxetic structure can have a thickness greater than five millimeters. In some embodiments, an auxetic structure can have a thickness greater than ten millimeters. In still other embodiments, the auxetic structure can have a thickness greater than ten millimeters. Moreover, the thickness of the auxetic structure can be selected in order to achieve desired properties such as cushioning and support.

Figure 46:
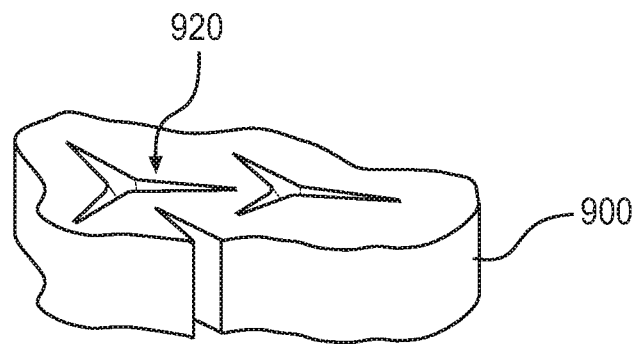
FIG. 46 is a schematic view of a portion of an outsole with apertures in a non-compressed configuration.
Figure 47:
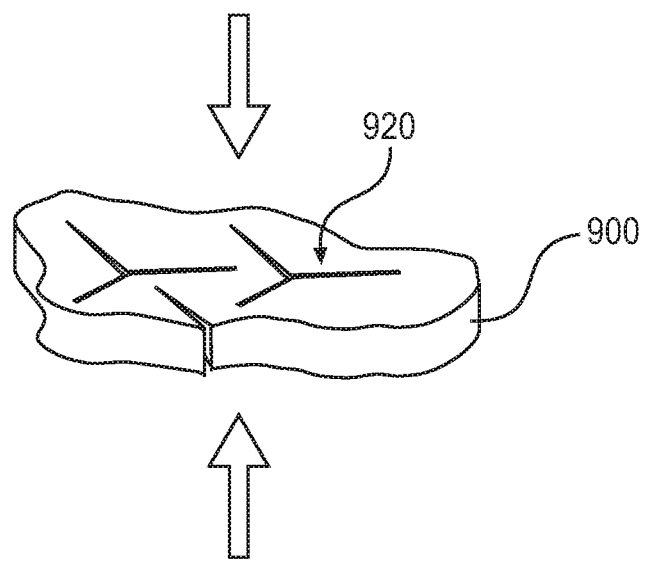
FIG. 47 is a schematic view of a portion of an outsole with apertures in a compressed configuration.

In some embodiments, the thickness of an auxetic structure in a sole can be used to enhance cushioning effects provided by the auxetic structure. FIGS. 46 and 47 illustrate how one or more apertures may change under applied compressive forces, which may generally be applied in the vertical direction. When the outsole is compressed, for example when the outsole hits the ground, the triangles tend to collapse towards the centers of their respective triangular apertures, thus increasing the material within the region of impact, and further cushioning the impact. On the other hand, when a portion of the outsole is under tension, for example when the wearer is pushing off from his or her forefoot, that portion of the outsole expands in the lateral as well as in the longitudinal direction, providing improved traction.

As seen in FIG. 46, with no compressive forces applied, apertures 920 of a portion of an outsole 900 (shown schematically) may initially be open. However, as compressive forces are applied, as shown in FIG. 47, apertures 920 may close. This may generally occur because the triangular portions 922 that surround apertures 920 may tend to expand in size under the compressive forces (due to mass conservation). This results in an inward contraction of apertures 920, which may have reduced opening sizes, or may completely close (as in FIG. 47). In particular, triangular portions 922 may be forced towards the centers of apertures 920.

While various embodiments have been described, the description is intended to be exemplary, rather than limiting and it will be apparent to those of ordinary skill in the art that many more embodiments and implementations are possible that are within the scope of the embodiments. Accordingly, the embodiments are not to be restricted except in light of the attached claims and their equivalents. Also, various modifications and changes may be made within the scope of the attached claims.

What is claimed is:

1. A sole structure for an article of footwear, the sole structure comprising:

a midsole structure formed from an ethylene-vinyl acetate or polyurethane foam and an outsole structure at least partially formed from a rubber, the outsole structure including an outsole layer and an outer covering disposed over the outsole layer, the outer covering including a ground-contacting surface disposed on one side of the outer covering;

wherein the sole structure has a longitudinal direction extending along a length of the article of footwear and a lateral direction extending along a width of the article of footwear;

wherein the longitudinal direction is tangential to the ground-contacting surface of the outer covering and the lateral direction is orthogonal to the longitudinal direction, wherein the lateral direction is also tangential to the ground-contacting surface of the outer covering;

a plurality of apertures extending through a thickness of the midsole structure and outsole layer, the plurality of apertures being arranged in geometric patterns to form an auxetic structure;

wherein the auxetic structure is such that tensioning the sole structure in one of the longitudinal direction and the lateral direction causes the outsole structure to expand in both the longitudinal direction and the lateral direction; and wherein the outer covering extends across and into each of the plurality of apertures in both of the midsole and the outsole to prevent water or debris from entering the apertures, and wherein the outer covering is in contact with a wall of each aperture.

2. The sole structure according to claim 1, wherein the outer covering comprises a stretchable elastic material.

3. The sole structure according to claim 1, wherein the outer covering includes a plurality of features that protrude from the ground-contacting surface and form protuberances on an opposite surface of the outer covering.

4. An article of footwear comprising an upper and a sole structure attached to the upper, wherein the sole structure has a longitudinal direction extending along a length of the article of footwear and a lateral direction extending along a width of the article of footwear, the longitudinal direction and the lateral direction defining a plane, and wherein the sole structure comprises a composite auxetic material, the composite auxetic material comprising:

a first layer formed from a rubber, the first layer material comprising a pattern of polygonal apertures surrounded by polygonal portions, wherein each polygonal portion is joined to an adjoining polygonal feature by a flexible joint such that the polygonal portions may rotate with respect to each other when the first layer is under tension;

a second layer formed from an ethylene-vinyl acetate or polyurethane foam and attached to the first layer, wherein the second layer has the same pattern of polygonal apertures as the first layer and wherein the pattern of polygonal apertures in the second layer is aligned with the pattern of polygonal apertures in the first layer;

an outer covering of flexible and elastic material attached to the first layer on a side of the first layer that is opposite to the second layer, wherein the outer covering extends across and into each of the polygonal apertures in both the first layer and the second layer, and wherein the outer layer is in contact with a wall of each aperture; and wherein when the composite auxetic material is under tension in a first direction, it expands in both the first direction and in a second direction that is orthogonal to the first direction.

5. The article of footwear according to claim 4, wherein the outer covering is configured to stretch to accommodate the expansion of the sole structure in the longitudinal direction and the lateral direction.

6. The article of footwear according to claim 4, wherein the outer covering further comprises a triangular tread pattern disposed on a ground-contacting surface of the outer covering.

7. The article of footwear according to claim 4, wherein the composite auxetic material further comprises a third layer of flexible and elastic material attached to the second layer on a side of the second layer that is opposite to the first layer, and wherein the third layer extends across each of the polygonal apertures in the second layer.

8. The article of footwear according to claim 4, wherein the outer covering comprises a pattern of polygonal features that protrude from its surface and that mate with the polygonal apertures in the first layer.

* * * * *